US012640902B2

(12) United States Patent
Nguyen et al.

(10) Patent No.: US 12,640,902 B2
(45) Date of Patent: May 26, 2026

(54) BLIND GODARD-BASED TIMING PHASE DETECTOR FOR T-SPACED TRANSMISSIONS

(71) Applicant: CIENA CORPORATION, Hanover, MD (US)

(72) Inventors: Trong Tung Nguyen, Kanata (CA); Tuan Vinh Tran, Kanata (CA); Shahab Oveis Gharan, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 39 days.

(21) Appl. No.: 18/814,686

(22) Filed: Aug. 26, 2024

(65) Prior Publication Data

US 2026/0058789 A1      Feb. 26, 2026

(51) Int. Cl.
*H04L 7/04*      (2006.01)
(52) U.S. Cl.
CPC ...................................... *H04L 7/04* (2013.01)
(58) Field of Classification Search
CPC ........................................................ H04L 7/04
See application file for complete search history.

(56) References Cited

U.S. PATENT DOCUMENTS

| | | | | |
|---|---|---|---|---|
| 2,006,024 A | * | 6/1935 | Lockwood | ................ F03D 9/28 |
| | | | | 416/169 R |
| 6,819,514 B1 | * | 11/2004 | Behrens | ........... G11B 20/10194 |
| 2004/0190649 A1 | * | 9/2004 | Endres | ................. H03G 3/3052 |
| | | | | 375/326 |
| 2006/0242445 A1 | * | 10/2006 | Aweya | ...................... H03L 7/08 |
| | | | | 713/400 |
| 2006/0285855 A1 | * | 12/2006 | Sun | ...................... H04B 10/508 |
| | | | | 398/155 |

OTHER PUBLICATIONS

Godard, Dominique N., "Self-Recovering Equalization and Carrier Tracking in Two-Dimensional Data Communication Systems", IEEE Transactions on Communications, vol. COM-28, No. 11, Nov. 1980, 9 Pages.

* cited by examiner

*Primary Examiner* — Dac V Ha
(74) *Attorney, Agent, or Firm* — Guntin & Gust, PLC; Kenneth S. Kwan

(57) ABSTRACT

Aspects of the subject disclosure may include, for example, obtaining, from a sampling device of a receiver, samples of a signal that is received from a transmitter, and facilitating acquisition between the receiver and the transmitter by deriving, based on the samples, a phase error output for centering a sampling clock of the sampling device with respect to a transmitter clock, wherein the deriving involves estimating group delay using a detection algorithm that is based on a blind Godard LMS algorithm.

22 Claims, 15 Drawing Sheets

250

X/Y-POL = X/Y POLARIZATION
XI, XQ = X-POL IN-PHASE, QUADRATURE

Figure 3:
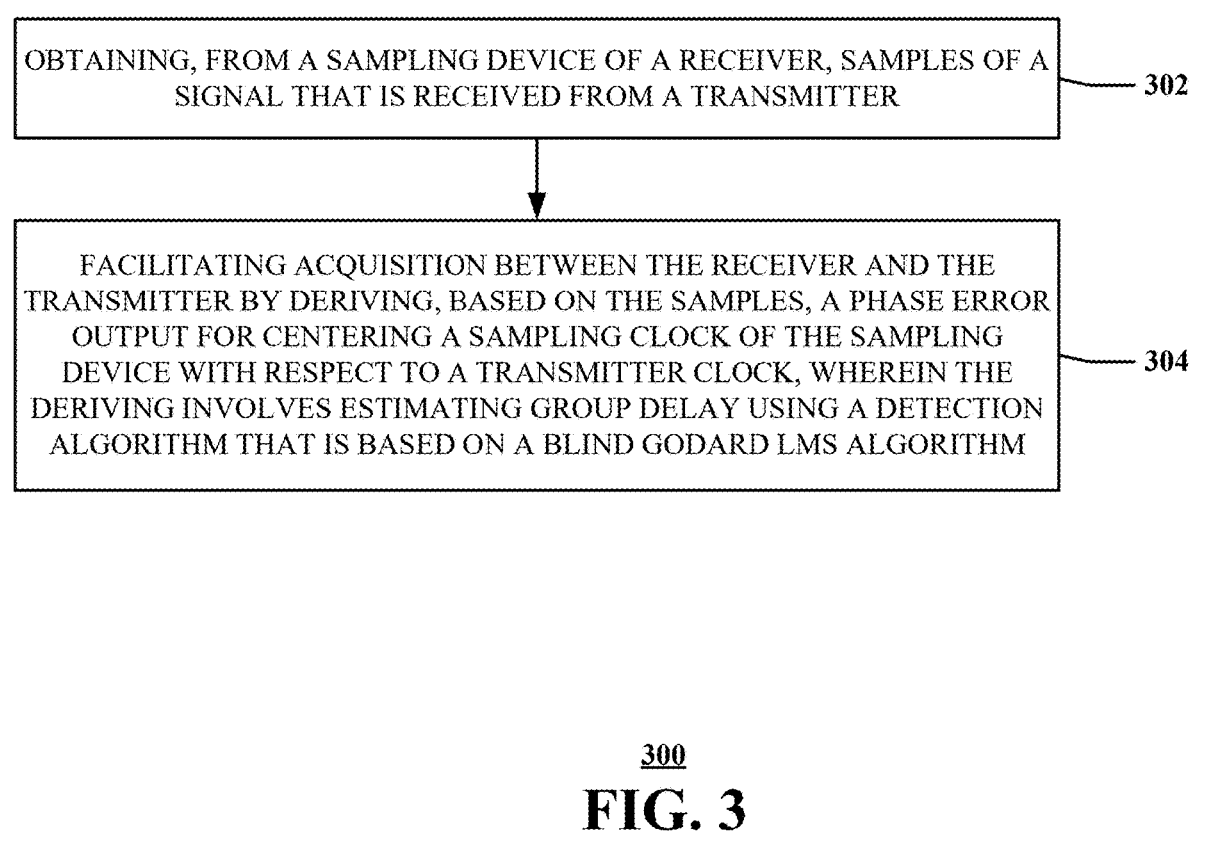

OBTAINING, FROM A SAMPLING DEVICE OF A RECEIVER, SAMPLES OF A SIGNAL THAT IS RECEIVED FROM A TRANSMITTER —— 302

FACILITATING ACQUISITION BETWEEN THE RECEIVER AND THE TRANSMITTER BY DERIVING, BASED ON THE SAMPLES, A PHASE ERROR OUTPUT FOR CENTERING A SAMPLING CLOCK OF THE SAMPLING DEVICE WITH RESPECT TO A TRANSMITTER CLOCK, WHEREIN THE DERIVING INVOLVES ESTIMATING GROUP DELAY USING A DETECTION ALGORITHM THAT IS BASED ON A BLIND GODARD LMS ALGORITHM —— 304

BLIND GODARD-BASED TIMING PHASE DETECTOR FOR T-SPACED TRANSMISSIONS

FIELD OF THE DISCLOSURE

The subject disclosure relates to blind Godard-based clock phase detection for T-spaced signals.

BACKGROUND

In a communication system, the acquisition process typically involves synchronization between a receiver (Rx) and a transmitter (Tx). This includes clock acquisition, where the receiver's sampling clock is aligned with the timing of symbols in a transmitted signal. In some system implementations, pilot symbols with known patterns are used to aid the acquisition process. The receiver can compare the received signal to these known patterns and adjust its clock to synchronize with the transmitter. In other system implementations, no pilot symbols are used. As one example, some systems rely on first decoding data symbols (that modulate a carrier that is transmitted and received at the receiver) and processing the decoded data using digital signal processing (DSP) techniques to aid the acquisition process. For instance, where an optical fiber is used as the transmission medium, an optical signal generated by a Tx laser can be modulated with the data symbols and transmitted along the fiber to a receiver that employs coherent detection. Such detection involves mixing of the received optical signal with an optical signal that is locally generated by an Rx oscillator, which results in an intermediate frequency (IF) signal that carries the modulated information. The carrier component can then be removed to retrieve the modulated data for the decoding.

Acquisition without the need for pilot symbols and without relying on decoded data would be beneficial, but presents several challenges—i.e., equalization via a least mean square (LMS)-based algorithm before the removal of the signal IF, and clock offset acquisition before the signal is equalized. With respect to the first challenge, D. Godard, "Self-Recovering Equalization and Carrier Tracking in Two-Dimensional Data Communication Systems," *IEEE Transactions on Communications*, vol. 28, no. 11, pp. 1867-1875 November 1980, which is incorporated by reference herein in its entirety, proposes a blind LMS scheme that does not rely on decoded feedback data. Specifically, Godard relies on a non-linear cost function, referred to as dispersion of order-p, to minimize inter-symbol interference (ISI). While this conventional system might work well if the signal spectrum has sufficient roll-off and excess bandwidth is fully captured at the receiver, these are generally not applicable to high spectral efficiency systems and some lower cost systems (e.g., serializer/deserializer (SerDes) systems).

BRIEF DESCRIPTION OF THE DRAWINGS

Reference will now be made to the accompanying drawings, which are not necessarily drawn to scale, and wherein:

FIG. 3 depicts an illustrative embodiment of a method in accordance with various aspects described herein.

DETAILED DESCRIPTION

Figure 1A:
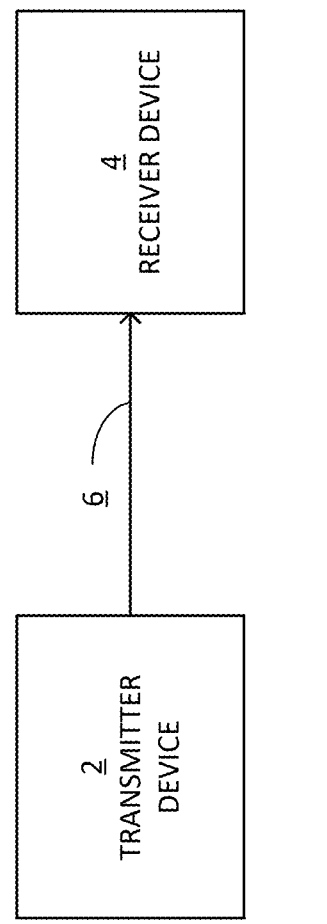
FIG. 1A is a diagram of a non-limiting example of a communication network in accordance with various aspects described herein.

The subject disclosure describes, among other things, illustrative embodiments of a blind clock phase detector that is implemented based on the Godard LMS algorithm. The blind clock phase detector may also be referred to herein as a blind Godard phase detector (PD) or, simply, a blind Godard detector. As described in more detail below, the Godard LMS algorithm provides a cost function that aims to reduce high-order signal dispersion. While this traditional Godard LMS algorithm aims to update LMS equalizer taps, exemplary embodiments of the blind Godard detector described herein leverage the algorithm for clock recovery purposes. In exemplary embodiments, the blind Godard detector can be capable of determining or detecting a clock phase error for a T-spaced system—i.e., one in which samples of a received signal are taken at intervals of the symbol period T; in other words, where samples are taken at a rate that is synchronized with the symbol rate. In various embodiments, the blind Godard detector can be capable of performing clock phase error recovery based (e.g., only) on the ADC output signal that is captured in an Rx front end test (RFET) memory. In exemplary embodiments, the blind Godard detector can be capable of extracting the clock phase as well as ppm offset without a need for any overhead data (such as channel information—e.g., pilot/training symbols, etc.) to be included in the transmitted signal and without relying on equalization or decoding of a received signal. Reducing or eliminating the need for overhead, for instance, advantageously improves spectrum efficiency. Avoiding waiting for decoded data also speeds up the acquisition process. In one or more embodiments, the blind Godard detector can be implemented in a clock recovery loop that is separate or decoupled from other equalizer (e.g., LMS or carrier recovery) loop(s), which can significantly improve the robustness of the receiver.

Conventional clock phase detection techniques suffer from various drawbacks. For instance, embedding sync and/or pilot patterns among data symbols introduces overhead and thus reduces spectral efficiency of the transmitted signal. The approach in which replications in the signal spectrum (i.e., excess bandwidth) are used to detect timing phase is generally susceptible to noise and interference. Methods where non-linear operations are performed on received symbols to obtain clock phase have less dynamic range and poor performance. The approach of scanning or sweeping the clock ppm offset over a range until the equalizer can acquire is also not robust and significantly increases acquisition time. It will be apparent to one skilled in the art that exemplary embodiments of clock phase detection described herein provide significant advantages over these conventional approaches.

One or more aspects of the subject disclosure include a receiver, comprising a sampling device configured to use a sampling clock to sample a signal that is received from a transmitter, and a blind clock phase detector configured to facilitate acquisition between the receiver and the transmitter by deriving, based on samples of the signal provided by the sampling device, a phase error output for centering the sampling clock with respect to a transmitter clock, wherein the deriving involves estimating group delay using a detection algorithm that is based on a blind Godard LMS algorithm.

One or more aspects of the subject disclosure include a non-transitory machine-readable medium, comprising executable instructions that, when executed by a processing system of a receiver including a processor, facilitate performance of operations. The operations may include obtaining, from a sampling device of the receiver, samples of a signal that is received from a transmitter. The operations may further include facilitating acquisition between the receiver and the transmitter by deriving, based on the samples, a phase error output for centering a sampling clock of the sampling device with respect to a transmitter clock, wherein the deriving involves estimating group delay using a detection algorithm that is based on a blind Godard LMS algorithm.

One or more aspects of the subject disclosure include a method. The method may include obtaining, by at least one processor of a receiver and from a sampling device of the receiver, samples of a signal that is received from a transmitter. The method may further include facilitating, by the at least one processor, acquisition between the receiver and the transmitter by deriving, based on the samples, a phase error output for centering a sampling clock of the sampling device with respect to a transmitter clock, wherein the deriving involves estimating group delay using a detection algorithm that is based on a blind Godard LMS algorithm.

FIG. 1A is a diagram of a non-limiting example of a communication network 1 in accordance with various aspects described herein. The communication network 1 may include at least one transmitter device 2 and at least one receiver device 4. The transmitter device 2 may be capable of transmitting signals over a communication channel, such as a communication channel 6. The receiver device 4 may be capable of receiving signals over a communication channel, such as the communication channel 6. In various embodiments, the transmitter device 2 may also be capable of receiving signals and/or the receiver device 4 may also be capable of transmitting signals. Thus, one or both of the transmitter device 2 and the receiver device 4 may be capable of acting as a transceiver.

The communication network 1 may include additional elements not shown in FIG. 1A. For example, the communication network 1 may include one or more additional transmitter devices, one or more additional receiver devices, and one or more other devices or elements involved in the communication of signals in the communication network 1.

In some embodiments, the signals that are transmitted and received in the communication network 1 may include optical signals and/or electrical signals. For example, the transmitter device 2 may be a first electrical-based transceiver, the receiver device 4 may be a second electrical-based transceiver, and the communication channel 6 may be an electrical communication channel (e.g., a coaxial cable, a printed circuit board (PCB) trace, or the like). For instance, the communication network 1 may include a SerDes system. As another example, the transmitter device 2 may be a first optical transceiver, the receiver device 4 may be a second optical transceiver, and the communication channel 6 may be an optical communication channel. In certain embodiments, one or both of the first optical transceiver and the second optical transceiver may be a coherent modem.

In various embodiments, each optical communication channel in the communication network 1 may include one or more links, where each link may include one or more spans, and where each span may include a length of optical fiber and one or more optical amplifiers. Where the communication network 1 involves the transmission of optical signals, the communication network 1 may include additional optical elements not shown in FIG. 1A, such as wavelength selective switches, optical multiplexers, optical de-multiplexers, optical filters, and/or the like.

Various elements and effects in an optical link between two communicating devices may result in the degradation of transmitted signals. That is, optical signals received over optical links can become distorted. Particularly, these signals may suffer from polarization mode dispersion (PMD), polarization dependent loss or gain (PDL or PDG), state of polarization (SOP) rotation, amplified spontaneous emission (ASE) noise, wavelength-dependent dispersion or chromatic dispersion (CD), nonlinear noise from propagation through fiber, and/or other effects. For instance, polarization effects of a fiber link tend to rotate the transmitted polarizations such that, at the receiver, they are neither orthogonal to each other nor aligned with the polarization beam splitter of the optical hybrid. As a result, each of the received polarizations (e.g., downstream of the polarization beam splitter) may contain energy from both of the transmitted polarizations, as well as distortions due to CD, PMD, PDL, etc. These problems may be compounded for polarization-division multiplexed signals in which each transmitted polarization contains a respective data signal. The degree of signal degradation due to noise and nonlinearity may be characterized by a signal-to-noise ratio (SNR) or, alternatively, by a noise-to-signal ratio (NSR). The signals transmitted in the communications network may be representative of digital information in the form of bits or symbols. The probability that bit estimates recovered at a receiver differ from the original bits encoded at a transmitter may be characterized by the Bit Error Ratio (BER). As the noise power increases relative to the signal power, the BER may also increase.

Figure 1B:
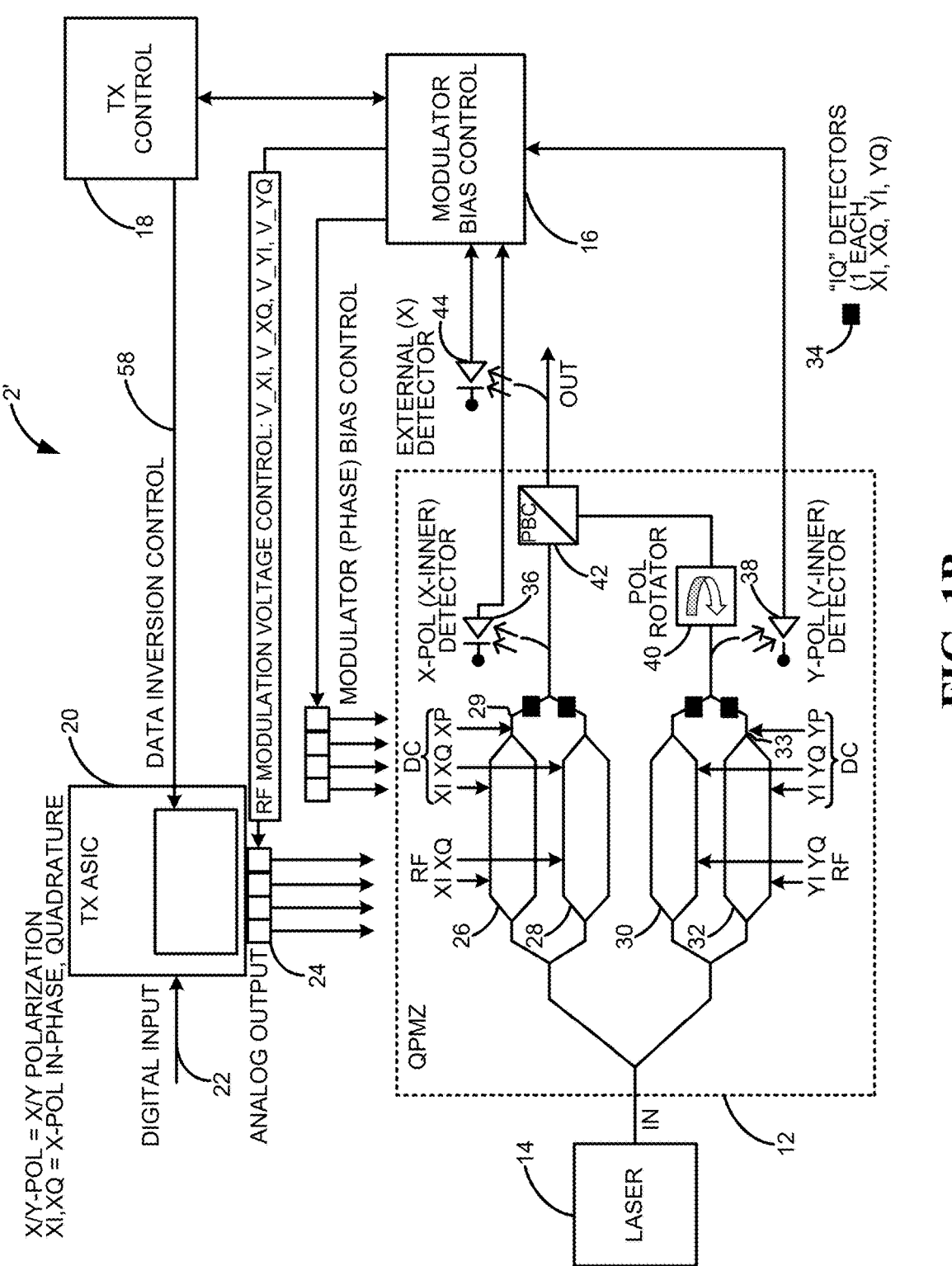
FIG. 1B is a block diagram of an example, non-limiting embodiment of a transmitter/modulator system in accordance with various aspects described herein.

FIG. 1B is a block diagram of an example, non-limiting embodiment of a transmitter/modulator system 2' in accordance with various aspects described herein. In one or more embodiments, the transmitter/modulator system 2' may correspond to the transmitter 2 of FIG. 1A. As shown in FIG. 1B, the transmitter device 2' may include a combination of optical and electrical components, such as, for example, a modulator 12, a laser 14, a modulator bias controller 16, a transmitter (Tx) controller 18, and a Tx application specific integrated circuit (ASIC) 20. The modulator 12 may employ nested Mach-Zehnder (MZ) architecture(s)—i.e., two dual-parallel MZs (DPMZs), each with two inner MZs and one outer MZ—resulting in a quad parallel MZ (QPMZ) modulator.

In one or more embodiments, the optical modulator system 2' may be equipped to control four quadrature data signals (i.e., radio frequency (RF) XI, RF XQ, RF YI, RF YQ signals, where X, Y denote polarization and I, Q denote in-phase and quadrature, respectively) via the Tx ASIC 20. The modulator 12 may include an XI modulator 26, an XQ modulator 28, and an outer phase modulator 29 (respectively functioning as two inner MZs nested within an outer MZ for the X polarization) as well as a YI modulator 30, a YQ modulator 32, and an outer phase modulator 33 (respectively functioning as two inner MZs nested within an outer MZ for the Y polarization). Each MZ may have one or two DC electrodes depending on the implementation of the MZ. The laser 14 may provide a laser output for modulation by the modulator 12. The laser output may be divided (e.g., via a beam splitter) into X and Y polarizations, where the X polarization may be further divided (e.g., via another beam splitter) into an optical I input that is fed into an X-pol I-arm (i.e., the XI modulator 26) and an optical Q input that is fed into an X-pol Q-arm (i.e., the XQ modulator 28), and where the Y polarization may be further divided (e.g., via yet another beam splitter) into an optical I input that is fed into a Y-pol I-arm (i.e., the YI modulator 30) and an optical Q input that is fed into a Y-pol Q-arm (i.e., the YQ modulator 32). The modulator 12 may be capable of independently generating orthogonal optical electric field components (I channel and Q channel) for each polarization X and Y, according to various types of multi-value modulation methods, such as N-quadrature amplitude modulation (QAM), differential quadrature phase shift keying (D-QPSK), etc.

In general operation, the Tx ASIC 20 may receive a digital information stream at a digital input 22 and convert the digital information stream (based on an associated modulation scheme) for driving the modulator 12 via analog outputs 24 (RF XI, RF XQ, RF YI, RF YQ). The analog outputs 24 may be communicatively coupled to the modulator 12. In some embodiments, the Tx ASIC 20 may include a digital filter that provides a transfer function H on the received digital input 22. A digital-to-analog (D/A) converter may be connected to an output of the digital filter, and an analog amplifier may be connected to an output of the D/A converter to provide a gain G. An output of the analog amplifier may provide the analog output 24 to the modulator 12. In certain embodiments, a controller may be connected to the digital filter and the analog amplifier to control the transfer function H and/or the gain G responsive to a data inversion control signal 58 from the Tx controller 18.

A detector 34 (also referred to as a tap-detector) may be included at an output of each of the modulators 26, 28, 30, 32. In certain embodiments, some or all of the modulators 26, 28, 30, 32 may be referred to as inner modulators and can be amplitude, phase, or mixed phase/amplitude modulators. In one or more embodiments, some or all of the modulators 26, 28, 30, 32 may be phase modulators. As shown, the modulator 12 may include an X-polarization detector 36 that is coupled to a combined output of the modulators 26, 28 (or the output of the outer MZ 29), and a Y-polarization detector 38 that is coupled to a combined output of the modulators 30, 32 (or the output of the outer MZ 33). A polarization rotator 40 may be connected to the combined output of the modulators 30, 32. A polarization beam combiner 42 may be connected to the combined output of the modulators 26, 28 and the combined output of the modulators 30, 32. An output of the polarization beam combiner 42 may provide a modulated output of the modulator 12, and an external detector 44 may be tapped off of the output. The various detectors 34, 36, 38, 44 may be communicatively coupled to the modulator bias controller 16.

As shown in FIG. 1B, several modulator bias points of the modulator 12 may be controlled or optimized via the modulator bias controller 16. In some embodiments, the Tx controller 18 may control the Tx ASIC 20 and/or the modulator bias controller 16. In various embodiments, the Tx controller 18 may control the modulator bias controller 16 in the following ways: (i) open loop control where bias control loops can be opened, enabling direct control of biases and measurement of the detectors 34, 36, 38, 44; and/or (ii) closed loop control where the feedback polarity of the modulator bias controller 16 can be set, but where the modulator bias controller 16 itself implements the feedback control. The Tx controller 18 may identify (e.g., optimum) bias points whereas the modulator bias controller 16 may maintain those points in service. In some embodiments, the modulator bias controller 16 may control the generated analog output signals of the Tx ASIC 20, rather than control bias values of the modulator 12.

Figure 1C:
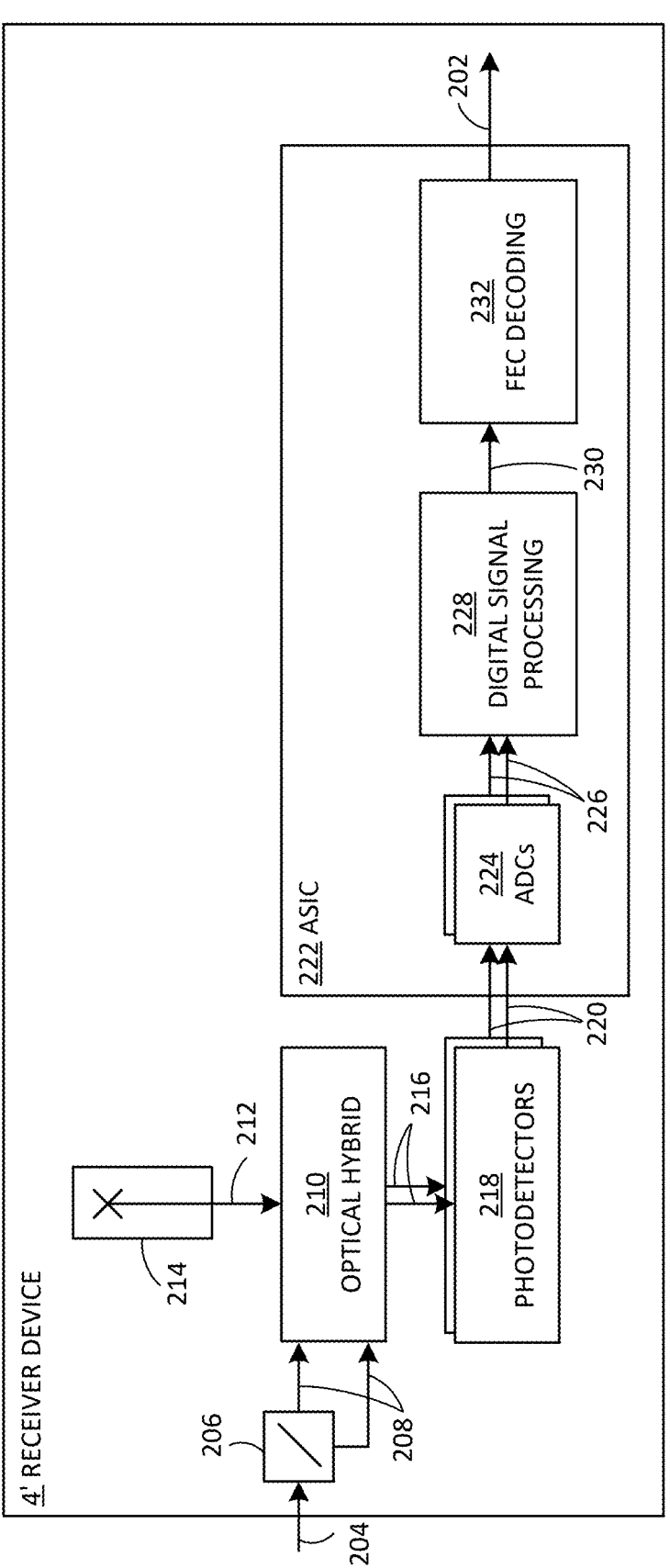
FIG. 1C is a block diagram of an example, non-limiting embodiment of a receiver device in accordance with various aspects described herein.

FIG. 1C is a block diagram of an example, non-limiting embodiment of a receiver device 4' in accordance with various aspects described herein. In one or more embodiments, the receiver device 4' may correspond to the receiver 4 of FIG. 1A. In various embodiments, the receiver device 4' may be configured to receive an optical signal 204, which may comprise a degraded version of an optical signal generated by a transmitter device (e.g., the transmitter device 2' of FIG. 1B). The optical signal generated by the transmitter device may be representative of information bits (also referred to as client bits) which are to be communicated to the receiver device 4'. The optical signal generated by the transmitter device may be representative of a stream of symbols. According to some examples, the transmitter device may be configured to apply forward error correction (FEC) encoding to the client bits to generate FEC-encoded bits, which may then be mapped to one or more streams of data symbols. The optical signal transmitted by the transmitter device may be generated using any of a variety of techniques, such as frequency division multiplexing (FDM), polarization-division multiplexing (PDM), single polarization modulation, modulation of an unpolarized carrier, mode-division multiplexing, spatial-division multiplexing, Stokes-space modulation, polarization balanced modulation, wavelength division multiplexing (WDM) (where a plurality of data streams is transmitted in parallel, over a respective plurality of carriers, and where each carrier is generated by a different laser), and/or the like.

The receiver device 4' may be configured to recover corrected client bits 202 from the received optical signal 204. The receiver device 4' may include a polarizing beam splitter 206 configured to split the received optical signal 204 into polarized components 208. According to one example implementation, the polarized components 208 may include orthogonally polarized components corresponding to an X polarization and a Y polarization. An optical hybrid 210 may be configured to process the components 208 with respect to an optical signal 212 produced by a laser 214, thereby resulting in optical signals 216. Photodetectors 218 may be configured to convert the optical signals 216 output by the optical hybrid 210 to analog electrical signals 220. The frequency difference between the Rx laser and the Tx laser is the Intermediate Frequency, and an offset of that away from nominal can be called fIF. (The nominal difference is usually zero.) According to one example implementation, the analog electrical signals 220 may include four signals corresponding, respectively, to the dimensions XI, XQ, YI, and YQ, where XI and XQ denote the in-phase and quadrature components of the X polarization, and YI and YQ denote the in phase and quadrature components of the Y polarization. Together, elements such as the beam splitter 206, the laser 214, the optical hybrid 210, and the photodetectors 218 may form a communication interface configured to receive optical signals from other devices in a communication network.

As shown in FIG. 1C, the receiver device 4' may include an ASIC 222. The ASIC 222 may include analog-to-digital converters (ADCs) 224 that are configured to sample the analog electrical signals 220 and generate respective digital signals 226. In certain alternate embodiments, the ADCs 224 or portions thereof may be separate from the ASIC 222. The ADCs 224 may sample the analog electrical signals 220 periodically at a sample rate that is based on a signal received from a voltage-controlled oscillator (VCO) at the receiver device 4' (not shown). The ASIC 222 may be configured to apply digital signal processing to the digital signals 226 using a digital signal processing system 228. The digital signal processing system 228 may be configured to perform equalization processing that is designed to compensate for a variety of channel impairments, such as CD, SOP rotation, mean PMD that determines the probability distribution which instantiates as differential group delay (DGD), PDL or PDG, and/or other effects. The digital signal processing system 228 may further be configured to perform carrier recovery processing, which may include calculating an estimate of carrier frequency offset fIF (i.e., the difference between the frequency of the transmitter laser and the frequency of the receiver laser 214). According to some example implementations, the digital signal processing system 228 may further be configured to perform operations such as multiple-input-multiple-output (MIMO) filtering, clock recovery, and FDM subcarrier de-multiplexing. The digital signal processing system 228 may also be configured to perform symbol-to-bit demapping (or decoding) using a decision circuit, such that signals 230 output by the digital signal processing system 228 are representative of bit estimates. Where the received optical signal 204 is representative of symbols comprising FEC-encoded bits generated as a result of applying FEC encoding to client bits, the signals 230 may further undergo FEC decoding 232 to recover the corrected client bits 202.

According to some example implementations, the equalization processing implemented as part of the digital signal processing system 228 may include one or more equalizers, some or all of which may be configured to compensate for impairments in the channel response. In general, an equalizer applies a substantially linear filter to an input signal to generate an output signal that is less degraded than the input signal. The filter may be characterized by compensation coefficients which may be incrementally updated from time to time (e.g., every so many clock cycles or every so many seconds) with the goal of reducing the degradation observed in the output signal.

Figure 2A:
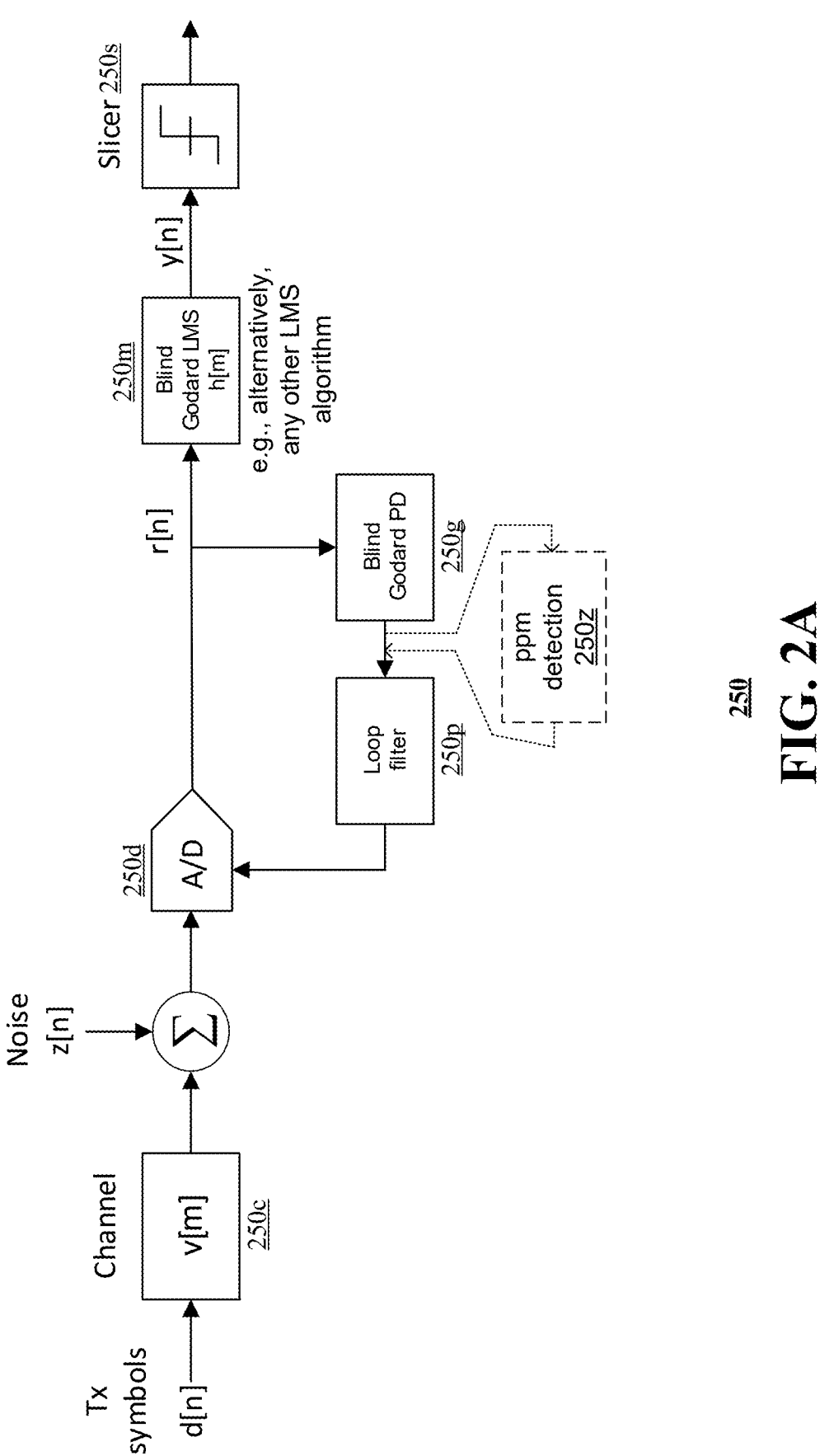
FIG. 2A is a block diagram illustrating a simplified example of a blind acquisition scheme, in accordance with various aspects described herein.

Embodiments described herein provide for a novel blind, non-linear clock phase detector that can be derived based on Godard's LMS technique. The clock phase detector can advantageously be used for T-spaced and oversampled signals, does not require or rely on overhead data inserted into the signal, and does not require pre-equalization of the received signal. In exemplary embodiments, blind clock recovery and LMS loops can be decoupled from one another. FIG. 2A is a block diagram 250 illustrating a simplified example of a blind acquisition scheme, in accordance with various aspects described herein. Exemplary embodiments of the blind acquisition scheme apply to signals that are transmitted and received over electrical channels (e.g., coaxial cables, PCB traces, or the like), such as in SerDes systems. The blind acquisition scheme illustrated in FIG. 2A may operate in the time domain. In various embodiments, some or all of the components in FIG. 2A may correspond to some or all of the components in FIG. 1A or be overlaid in the system of FIG. 1A. In some embodiments, the blind acquisition scheme can be adapted for signals that are transmitted and received over optical channels (e.g., fiber, etc.). In these embodiments, if equalization is performed in the frequency domain after performing ADC, and frequency division multiplexing (FDM) downsampling and decoding are subsequently performed, the blind acquisition scheme (or an adaptation thereof) may be implemented after the FDM downsampling, but prior to the decoding, where the output of the scheme can be fed back to the ADC to lock the Rx sampling clock to the Tx data clock.

In FIG. 2A, assume the following denotations:

d[n]: transmitted symbols, which may be drawn from a constellation (e.g., 4-pulse amplitude modulation (PAM), 16-QAM, etc.)

v[m]: baseband equivalent channel—i.e., a physical medium that the signal travels through, such as, for instance, an electrical channel or an optical fiber, which may run at a symbol rate (e.g., T-spaced)· z[n]: added Gaussian noise (e.g., which can include thermal noise, quantization noise, and/or coupling noise relating to the channel)· r[n]: received signal after channel distortion and noise h[m]: LMS coefficients for equalizing the channel y[n]: equalized signal, ready for slicing At a transmitter (e.g., the transmitter 2 of FIG. 1A), transmitted symbols d[n] may be sent through the channel v[m] (250c) (e.g., the communication channel 6 of FIG. 1A). The channel may introduce noise z[n] that is added to the transmitted symbols. The combined signal (or a corresponding signal) may be fed into an analog-to-digital (A/D) converter (ADC) block 250d of a receiver (e.g., the receiver 4 of FIG. 1A), which can convert the analog signal into a digital one—i.e., received signal r[n]. This received signal can be processed by the blind Godard LMS block h[m] (250m). Particularly, the LMS algorithm may adjust the coefficients of a linear combiner to reduce or minimize the mean squared error between the received signal and an expected signal. The output of the blind Godard LMS block 250m can be fed to a slicer block 250s for slicing (e.g., back into constellation symbols, such as 4-PAM, via thresholding). It will be understood and appreciated that, while a blind Godard LMS algorithm is shown as the equalizer implementation in FIG. 2A, any other type of LMS algorithm (e.g., a decision-directed LMS algorithm) or a combination of one or more types of LMS algorithms can be employed in block 250m. In any case, the received signal r[n] may also be processed by a blind Godard PD block 250g. The output of the blind Godard PD block 250g (i.e., a determined clock phase error) may be provided to a loop filter 250p to adjust the sampling phase of the ADC block 250d.

The following is a description of the derivation of the blind Godard clock phase detector implementation based on Godard's blind LMS. First, Godard's blind LMS equalization minimizes the following cost function:

$$D^{(p)} = E(|y[n]|^p - R_p)^2$$

which is referred to as dispersion of order-p. The constant $R_p$ is a real positive that is dependent on the transmitted signal constellation type (e.g., where a different $R_p$ value may apply for 4-PAM versus 16-QAM, etc.):

$$R_p = \frac{E(|d[n]|^{2p})}{E(|d[n]|^p)}$$

The most popular choice is p=2, where the adaptive blind LMS algorithm would involve:

Equalizing the signal (where the received signal r[n] is multiplied with current tap weights $h_i$ to produce an estimate of the transmitted signal y[n]):

$$y[n] = r[n]^T \cdot h_i$$

Calculating the error function (by taking the difference between the estimated signal and a reference signal, which is squared and averaged over time):

$$e[n] = y[n](|y[n]|^2 - R_2)$$

Updating new taps based on the error and using a step size u (to reduce or minimize the error such that the signal is least dispersive and ISI is reduced or removed):

$$h_{i+1} = h_i - \mu \cdot r[n]^* \cdot e[n]$$

In this set of equations, the emboldened symbols represent a column vector of length L, which is the number of LMS taps. For the non-linear algorithm to work well, the LMS taps must be initialized with adequate power, typically as an impulse with power of 1.

To detect clock phase, we can employ an L=3 taps blind LMS implementation. For example, for a signal with a group delay of $\tau \in [-0.5, 0.5]$ unit interval (UI), the LMS response can be approximated as a sinc pulse, i.e.

$$h[m] \approx \text{sinc}(m + \tau), \ m = [-1, 0, 1]$$

The group delay can thus be estimated as $$\tau \approx 0.5 \cdot (h[-1] - h[1])$$

Now, if we fix the center tap h[0]=1, we can estimate the 2 side taps in a feed-forward manner as $$h[-1] = E(r[n-1]^* \cdot r[n] \cdot (|r[n]|^2 - R_2)), \text{ and}$$

$$h[1] = E(r[n+1]^* \cdot r[n] \cdot (|r[n]|^2 - R_2))$$

To further reduce the complexity of the phase detector, the dispersion cost function can be used with p=1, and the side taps would become:

$$h[m] = E(r[n+m]^* \cdot r[n] \cdot (|r[n]| - R_1)), \ m = [-1, 1]$$

$$= E(r[n+m]^* \cdot r[n] \cdot |r[n]|) - R_1 \cdot E(r[n+m]^* \cdot r[n])$$

Notice the $2^{nd}$ term is simply a scaled auto-correlation at m-lag, and can thus be cancelled out in the phase detection formula, which yields the following blind Godard phase detector formula:

$$\hat{\tau} = g \cdot r[n] \cdot |r[n]| \cdot (r[n-1]^* - r[n+1]^*)$$

where $g=E(|d[n]|^2)/2$ is normalized scaling factor. It will be apparent to one skilled in the art that this metric (or output) of the blind Godard detector formula is insensitive to carrier frequency offset (CFO). Note that this formula is generalized to apply to systems involving electrical signals (e.g., SerDes systems) that have only real baseband values as well as to systems involving optical signals (e.g., coherent detection systems) that have both real and imaginary baseband values. Inclusion of the conjugates advantageously provides for robustness in the case where laser IF is involved. Of course, for systems that involve (e.g., only) electrical signals, the conjugations in the blind Godard phase detector formula may not be needed.

Alternative series of blind Godard phase detectors can be devised as follows:

A higher dispersion order can be used instead:

$$\hat{\tau} := r[n] \cdot |r[n]|^p \cdot (r[n-1]^* - r[n+1]^*), \ p = 1, 2, 3, \ldots$$

Instead of involving 3 samples in the calculation, a formula involving only 2 adjacent samples can be used, e.g.:

$$\hat{\tau} := r[n+0.5] \cdot |r[n+0.5]|^p \cdot (r[n+1]^* - r[n]^*)$$

where the center sample is taken by interpolating the 2 adjacent ones, i.e.:

$$r[n+0.5] = 0.5(r[n] + r[n+1])$$

It should be noted that this type of metric will, by design, converge to 0.5 UI by aiming to obtain the same amount of ISI on r[n] and r[n+1], where, of course, the ideal would instead be to have the clock phase converged or locked at 0.0 UI. However, since the S-curve of the blind Godard detector metric is a (e.g., perfect) sinusoid, a 0.5 UI shift can be made by inverting the polarity of the metric (so as to obtain 0.0 UI), hence the part (r[n+1]*−r[n]*). This also allows for the slope of the S-curve to be positive (rather than negative), thereby resulting in negative feedback for the clock recovery loop (i.e., with loop filter 250p) and thus a stable system.

The following description relates to an analysis of the performance of the blind Godard phase detector metric. For sake of simplicity, we focus here on the case of p=2, where the metric can be analytically tracked as:

$$\hat{\tau} := r[n] \cdot |r[n]|^2 \cdot (r[n-1]^* - r[n+1]^*)$$

In an electrical channel scenario, the channel response is purely real and the transmitted symbol sequence is also a real sequence. Let us denote the transmitted sequence by s(t), where s(t)∈C and C denotes the constellation set, such as C={−3,−1,1,3} for 4-PAM transmission over an electrical SerDes channel. The output of the channel can be calculated as:

$$x(t) = \sum_{\tau=-\infty}^{\infty} h(\tau) \cdot s(t - \tau)$$

Without loss of generality, let us assume that an integer delay is removed from the channel response such that |h(0)|≥|h(±1, ±2, ... )|. Per the blind Godard phase detector metric, let us calculate the 3rd moment of a sample by taking the difference between neighboring samples:

$$\phi_G := E\{x^3(t) \cdot (x(t+1) - x(t-1))\}$$

$$= E\left\{\left(\sum_{\tau=-\infty}^{\infty} h(\tau) \cdot s(t-\tau)\right)^3 \left(\sum_{\tau=-\infty}^{\infty} s(t-\tau) \cdot (h(\tau+1) - h(\tau-1))\right)\right\}$$

$$= E\{s^4(t)\} \cdot \sum_{\tau=-\infty}^{\infty} h^3(\tau) \cdot (h(\tau+1) - h(\tau-1)) + 3 \cdot$$

$$E^2\{s^2(t)\} \sum_{\tau=-\infty}^{\infty} \sum_{\tau' \neq \tau} h^2(\tau') \cdot h(\tau) \cdot (h(\tau+1) - h(\tau-1))$$

$$= (E\{s^4(t)\} - 3 \cdot E^2\{s^2(t)\}) \cdot \sum_{\tau=-\infty}^{\infty} h^3(\tau) \cdot (h(\tau+1) - h(\tau-1)) + 3 \cdot$$

$$E^2\{s^2(t)\} \sum_{\tau'=-\infty}^{\infty} h^2(\tau') \cdot \sum_{\tau=-\infty}^{\infty} h(\tau) \cdot (h(\tau+1) - h(\tau-1))$$

$$= (E\{s^4(t)\} - 3 \cdot E^2\{s^2(t)\}) \cdot \sum_{\tau=-\infty}^{\infty} h^3(\tau) \cdot (h(\tau+1) - h(\tau-1))$$

In order to further simplify the above equation into an actual clock phase error metric, let us impose another constraint that |h(0)|>>|h(±1, ±2, ... )|. This assumption is particularly valid for Nyquist pulse-shapes. Applying this constraint, we can approximate the expected value of the clock metric as $$\phi_G \approx (E\{s^4(t)\} - 3 \cdot E^2\{s^2(t)\}) \cdot h^3(0) \cdot (h(1) - h(-1))$$

Several things to note are:

The estimated clock phase error is proportional to the pre-cursor and post-cursor tap difference, i.e., h(1)−h(−1), which is an estimate of true clock phase error.

The estimated clock phase error is proportional to the weighted difference of the 4th moment and 2nd moment square of the transmitted signal, i.e., it is proportional to $E\{s^4(t)\} - 3 \cdot E^2\{s^2(t)\}$. For a larger metric, we would expect better SNR from the blind Godard phase detector metric.

Assuming that the transmitted signal power is normalized to "1", i.e. $E\{s^2(t)\}=1$, we observe that the reliability and the SNR of the blind Godard phase detector metric is related to the metric $E\{s^4(t)\}-3$.

In an optical channel scenario, we assume an optical channel where the channel response can be a complex response. Furthermore, the transmitted constellation set can be a complex modulation, such as QAM modulation. In this case, the expected value of the metric can be calculated as:

$$\phi_G := E\{x(t) \cdot |x^2(t)| \cdot (x(t+1) - x(t-1))^*\}$$

$$= E\left\{\left(\sum_{\tau=-\infty}^{\infty} h(\tau) \cdot s(t-\tau)\right)^2 \left(\sum_{\tau=-\infty}^{\infty} h^*(\tau) \cdot s^*(t-\tau)\right)\left(\sum_{\tau=-\infty}^{\infty} s^*(t-\tau) \cdot (h^*(\tau+1) - h^*(\tau-1))\right)\right\}$$

$$= \sum_{\tau_1=-\infty}^{\infty} \sum_{\tau_2=-\infty}^{\infty} \sum_{\tau_3=-\infty}^{\infty} \sum_{\tau_4=-\infty}^{\infty} h(\tau_1) \cdot h(\tau_2) \cdot h^*(\tau_3) \cdot (h^*(\tau_4+1) - h^*(\tau_4-1)) \cdot E\{s(t-\tau_1) \cdot s(t-\tau_2) \cdot s^*(t-\tau_3) \cdot s^*(t-\tau_4)\}$$

Since the transmitted symbols are independent, the term $E\{s(t-\tau_1) \cdot s(t-\tau_2) \cdot s^*(t-\tau_3) \cdot s^*(t-\tau_4)\}$ is zero unless $\tau_1=\tau_3$ and $\tau_2=\tau_4$ or $\tau_1=\tau_4$ and $\tau_2=\tau_3$. Hence, we can summarize the above equation as:

$$\phi_G := E\{x(t) \cdot |x^2(t)| \cdot (x(t+1) - x(t-1))^*\}$$

$$= E\left\{\left(\sum_{\tau=-\infty}^{\infty} h(\tau) \cdot s(t-\tau)\right)^2 \left(\sum_{\tau=-\infty}^{\infty} h^*(\tau) \cdot s^*(t-\tau)\right)\left(\sum_{\tau=-\infty}^{\infty} s^*(t-\tau) \cdot (h^*(\tau+1) - h^*(\tau-1))\right)\right\}$$

$$= \sum_{\tau_1=-\infty}^{\infty} \sum_{\tau_2 \neq \tau_1} h(\tau_1) \cdot h(\tau_2) \cdot h^*(\tau_1) \cdot (h^*(\tau_2+1) - h^*(\tau_2-1)) \cdot E\{s(t-\tau_1) \cdot s(t-\tau_2) \cdot s^*(t-\tau_1) \cdot s^*(t-\tau_2)\} +$$

$$\sum_{\tau_1=-\infty}^{\infty} \sum_{\tau_2 \neq \tau_1} h(\tau_1) \cdot h(\tau_2) \cdot h^*(\tau_2) \cdot (h^*(\tau_1+1) - h^*(\tau_1-1)) \cdot E\{s(t-\tau_1) \cdot s(t-\tau_2) \cdot s^*(t-\tau_2) \cdot s^*(t-\tau_1)\} -$$

$$\sum_{\tau_1=-\infty}^{\infty} h(\tau_1) \cdot h(\tau_1) \cdot h^*(\tau_1) \cdot (h^*(\tau_1+1) - h^*(\tau_1-1)) \cdot E\{s(t-\tau_1) \cdot s(t-\tau_1) \cdot s^*(t-\tau_1) \cdot s^*(t-\tau_1)\}$$

$$= 2 \cdot \sum_{\tau_1=-\infty}^{\infty} \sum_{\tau_2 \neq \tau_1} |h(\tau_1)|^2 \cdot h(\tau_2) \cdot (h^*(\tau_2+1) - h^*(\tau_2-1)) \cdot E\{|s(t-\tau_1)|^2 \cdot |s(t-\tau_2)|^2\} - \sum_{\tau_1=-\infty}^{\infty} h(\tau_1) \cdot |h(\tau_1)|^2 \cdot (h^*(\tau_1+1) - h^*(\tau_1-1)) \cdot E\{|s(t-\tau_1)|^4\}$$

Now, evaluating the above expression, we observe that $E\{|s(t-\tau_1)|^2 \cdot |s(t-\tau_2)|^2\} = E\{s(t-\tau_1)|^2\} \cdot E\{|s(t-\tau_2)|^2\}$, unless $\tau_1 = \tau_2$. Hence, above expression can be simplified as:

$$\phi_G = 2 \cdot \sum_{\tau_1=-\infty}^{\infty} \sum_{\tau_2 \neq \tau_1} |h(\tau_1)|^2 \cdot h(\tau_2) \cdot (h^*(\tau_2+1) - h^*(\tau_2-1)) \cdot$$

$$E\{|s(t-\tau_1)|^2\} \cdot E\{|s(t-\tau_2)|^2\} + \sum_{\tau_1=-\infty}^{\infty} h(\tau_1) \cdot |h(\tau_1)|^2 \cdot$$

$$(h^*(\tau_1+1) - h^*(\tau_1-1)) \cdot E\{|s(t-\tau_1)|^4\} -$$

$$2 \cdot \sum_{\tau_1=-\infty}^{\infty} h(\tau_1) \cdot |h(\tau_1)|^2 \cdot (h^*(\tau_1+1) - h^*(\tau_1-1)) \cdot E^2\{|s(t-\tau_1)|^2\}$$

$$= 2 \cdot E^2\{|s(t)|^2\} \cdot \sum_{\tau_1=-\infty}^{\infty} \sum_{\tau_2 \neq \tau_1} |h(\tau_1)|^2 \cdot h(\tau_2) \cdot (h^*(\tau_2+1) - h^*(\tau_2-1)) +$$

$$E\{|s(t)|^4\} \cdot \sum_{\tau_1=-\infty}^{\infty} h(\tau_1) \cdot |h(\tau_1)|^2 \cdot (h^*(\tau_1+1) - h^*(\tau_1-1)) -$$

$$2 \cdot E^2\{|s(t)|^2\} \cdot \sum_{\tau_1=-\infty}^{\infty} h(\tau_1) \cdot |h(\tau_1)|^2 \cdot (h^*(\tau_1+1) - h^*(\tau_1-1))$$

Now, taking the real part of $\phi_G$, we have:

$$\text{real}(\phi_G) = 2 \cdot E^2\{|s(t)|^2\} \cdot \sum_{\tau_1=-\infty}^{\infty} |h(\tau_1)|^2 \cdot \sum_{\tau_2 \neq \tau_1} \text{real}\,(h(\tau_2) \cdot (h^*(\tau_2+1) -$$

$$h^*(\tau_2-1))) + E\{|s(t)|^4\} \cdot \sum_{\tau_1=-\infty}^{\infty} |h(\tau_1)|^2 \cdot \text{real}\,(h(\tau_1) \cdot$$

$$(h^*(\tau_1+1) - h^*(\tau_1-1))) - 2 \cdot E^2\{|s(t)|^2\} \cdot \sum_{\tau_1=-\infty}^{\infty} |h(\tau_1)|^2 \cdot$$

$$\text{real}\,(h(\tau_1) \cdot (h^*(\tau_1+1) - h^*(\tau_1-1)))$$

$$= 2 \cdot E^2\{|s(t)|^2\} \cdot \sum_{\tau_1=-\infty}^{\infty} |h(\tau_1)|^2 \cdot \sum_{\tau_2 \neq \tau_1} \text{real}\,(h(\tau_2) \cdot (h^*(\tau_2+1) -$$

$$h^*(\tau_2-1))) + (E\{|s(t)|^4\} - 2 \cdot E^2\{|s(t)|^2\}) \cdot$$

$$\sum_{\tau_1=-\infty}^{\infty} |h(\tau_1)|^2 \cdot \text{real}\,(h(\tau_1) \cdot (h^*(\tau_1+1) - h^*(\tau_1-1)))$$

In order to eliminate the first term, we have to guarantee that:

$$\sum_{\tau_2=-\infty}^{\infty} \text{real}\,(h(\tau_2) \cdot (h^*(\tau_2+1) - h^*(\tau_2-1))) = 0$$

However, the above term is equal to:

$$\sum_{\tau_2=-\infty}^{\infty} \text{real}\,(h(\tau_2) \cdot (h^*(\tau_2+1) - h^*(\tau_2-1))) =$$

$$\sum_{\tau_2=-\infty}^{\infty} \text{real}(h(\tau_2) \cdot h^*(\tau_2+1) - h^*(\tau_2) \cdot h(\tau_2+1)) = 0$$

To summarize, the first term can disappear. Hence, the final equation summarizes to:

$$\text{real}(\phi_G) = (E\{|s(t)|^4\} - 2 \cdot E^2\{|s(t)|^2\}) \cdot$$

$$\sum_{\tau_1=-\infty}^{\infty} |h(\tau_1)|^2 \cdot \text{real}\,(h(\tau_1) \cdot (h^*(\tau_1+1) - h^*(\tau_1-1)))$$

Several things to note are:

The estimated clock phase error is proportional to the pre-cursor and post-cursor tap difference, i.e. h(1)–h(−1), which is an estimate of true clock phase error.

The estimated clock phase error is proportional to the weighted difference of the $4^{th}$ moment and $2^{nd}$ moment square of transmitted signal, i.e., it is proportional to $E\{|s(t)|^4\} - 2 \cdot E^2\{|s(t)|^2\}$. For a larger metric, we would expect better SNR from the blind Godard phase detector metric.

The following table is a summary of the performance of the blind Godard phase detector for various different constellation formats based on evaluations of the $4^{th}$ moment metric derived above. As shown, the best metric is achieved for the 2-PAM/QPSK modulation format. Unshaped QAM modulations provide a fine metric value. However, Gaussian distribution provides a metric value of "0", meaning that the blind Godard phase detector metric SNR approaches "0". As probabilistic shaping is enabled, the underlying distribution approaches Gaussian distribution quickly and the blind Godard phase detector metric SNR also approaches "0".

| Constellation | Real Metric $E\{s^4(t)\} - 3 \cdot E^2\{s^2(t)\}$ | Complex Metric $E\{|s(t)|^4\} - 2 \cdot E^2\{|s(t)|^2\}$ |
|---|---|---|
| Gaussian | 0 | 0 |
| 2-PAM ({−1, 1}) or QPSK | −2 | −1 |
| 4-PAM or 16-QAM | −1.36 | −0.68 |
| 8-PAM or 64-QAM | −1.24 | −0.62 |
| Probabilistic Shaped 4-PAM/16-QAM at 1.5 bits/dimension | −0.23 | −0.11 |
| Probabilistic Shaped 8-PAM/64-QAM at 2 bits/dimension | 0 | 0 |

Figure 2B:
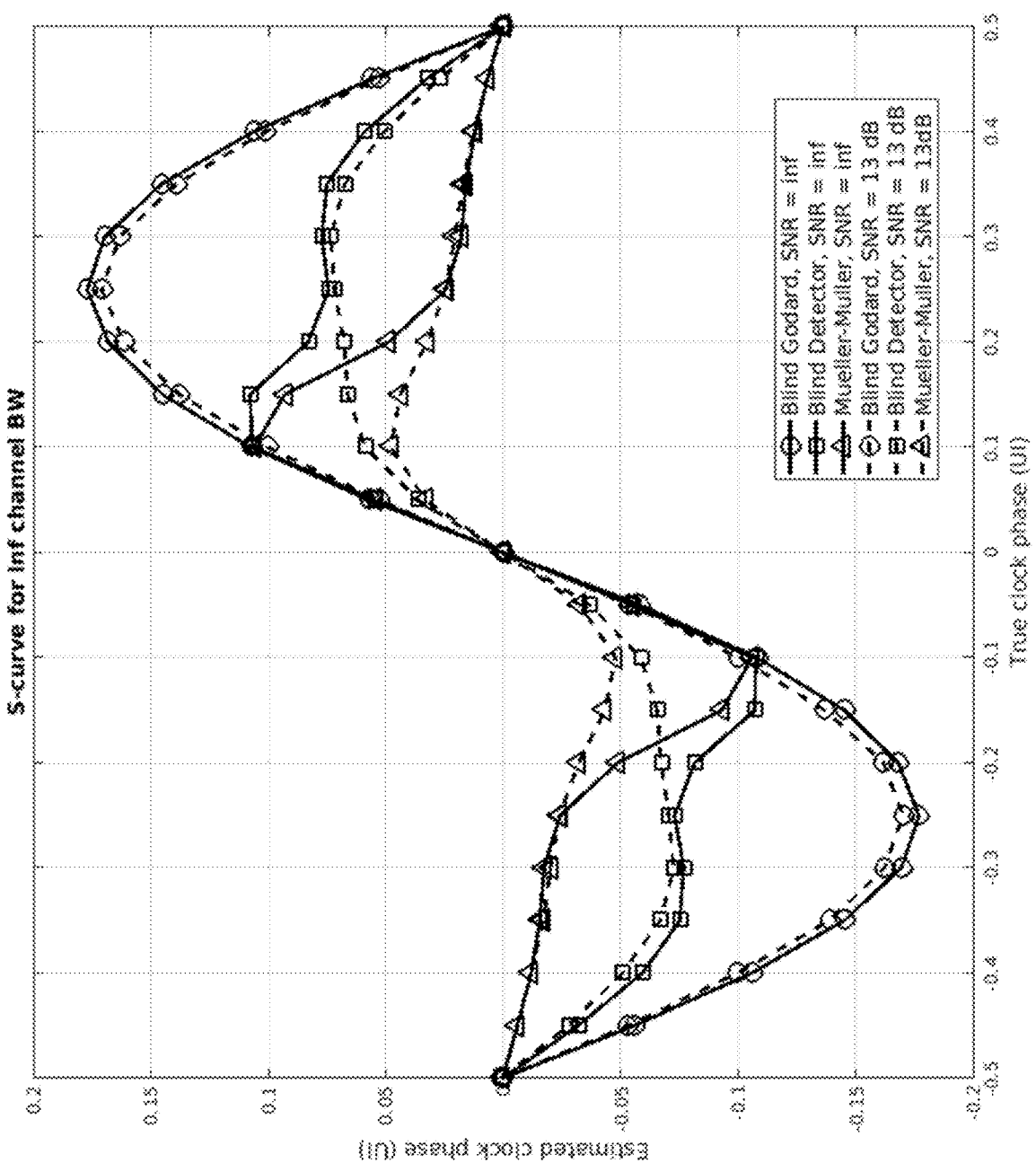
FIG. 2B illustrates the stability (S-curve) characteristics for three clock phase detectors in which the channel bandwidth is assumed to be infinite and for the cases of infinite signal-to-noise ratio (SNR) and SNR of 13 decibels (dB).

The following is a description of the overall performance of the exemplary blind Godard clock phase detector as compared to several existing phase detectors that are based on the Mueller and Muller (MM) algorithm (i.e., a well-known timing synchronization technique that operates at symbol rate), particularly one acquisition detector algorithm that will be referred to hereafter as a blind detector, and a decision-directed algorithm that will be referred to hereafter as a (e.g., mission-mode) MM detector. FIG. 2B illustrates the S-curve characteristics for the three clock phase detectors in which the channel bandwidth is assumed to be infinite and for the cases of infinite SNR and SNR of 13 dB. The channel model is assumed be flat and only additive white Gaussian noise (AWGN) is added. The channel group delay was swept from −0.5 to 0.5 UI and at each delay, we averaged over $1^e6$ output phases $\hat{\tau}$. The blind Godard clock phase detector provides for an essentially perfect sinusoidal S-curve regardless of noise level, while the S-curve for the blind detector and MM detector methods are compressed at high noise, with the S-curve for the MM detector method being the most compressed due to modulation error. The blind detector and the MM detector appear to exhibit good detector linearity within a short range of [−0.1, 0.1] UI (i.e., once ISI starts becoming significant), while the exemplary blind Godard method maintains good linearity over a wider range of [−0.25, 0.25] UI. The blind Godard detector nevertheless seems to be sensitive to both channel ISI and AWGN.

FIGS. 2C to 2H illustrate S-curve and phase detector (PD) noise power spectral density (PSD) characteristics for a 100 GHz channel bandwidth, a 50 GHz channel bandwidth, and a 25 GHz channel bandwidth. In an evaluation, the following were assumed for a simplistic SerDes channel model:

112 gigabaud (Gbaud) 4-PAM transmission
  The channel is not flat, but rather has a first-order infinite impulse response (IIR):

$$V(z) = \frac{\sqrt{\left(1 - (1 - a)^2\right)}}{1 - (1 - a)z^{-1}}$$

The integrated channel power was normalized to 1 to mimic the effect of Rx automatic gain control (AGC) gain. Given a 112 Gbaud signal, −3 dB channel bandwidths of 100 GHz, 50 GHz, and 25 GHz corresponding to a=0.825, 0.7031 and 0.4904, respectively, were used.
  AWGN noise at 13 dB SNR
  No equalizer applied on the signal prior to clock phase detection so as to aim for "totally blind" acquisition.

Figure 2C:
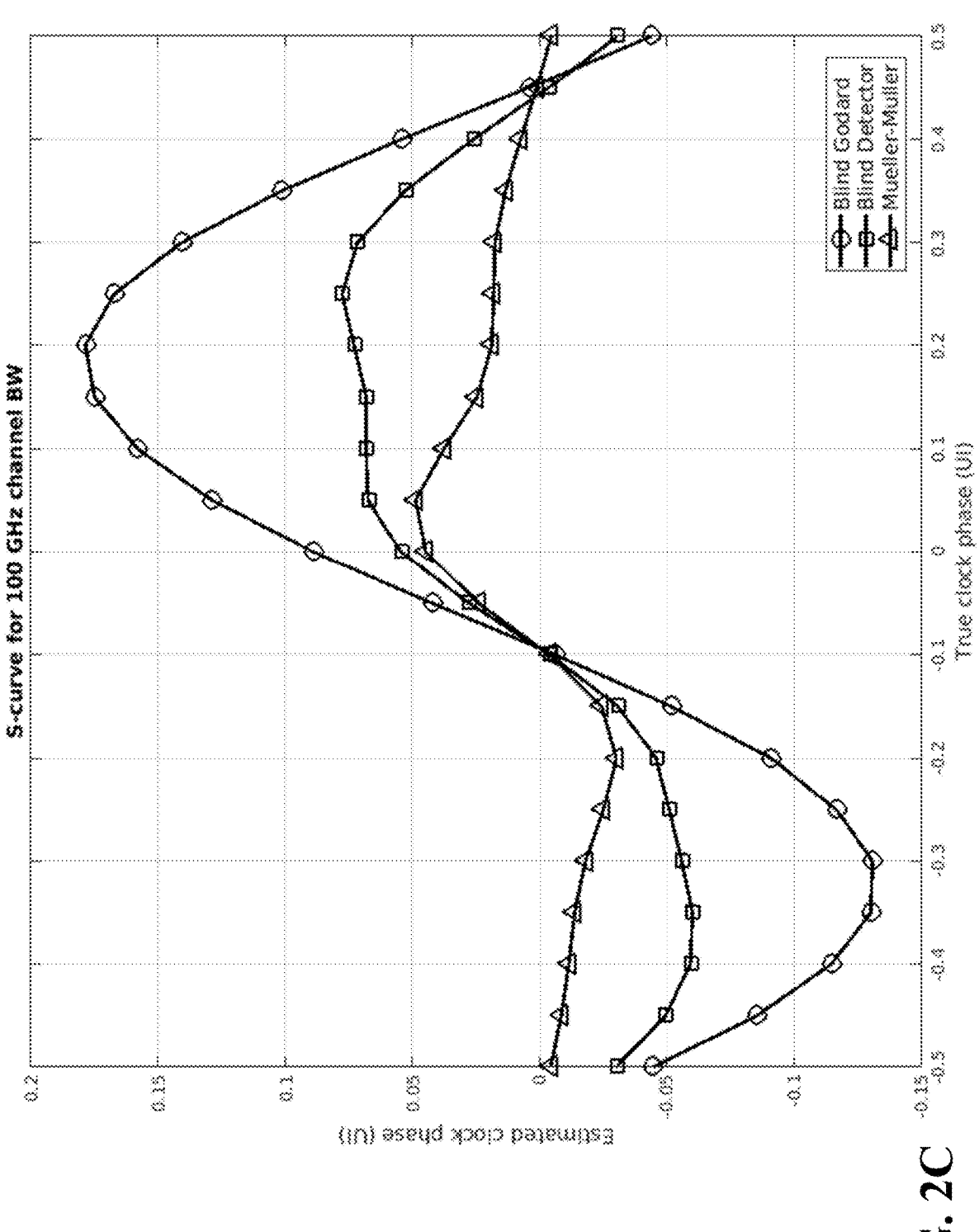
FIGS. 2C to 2H illustrate S-curve and phase detector (PD) noise power spectral density (PSD) characteristics for a 100 Gigahertz (GHz) channel bandwidth, a 50 GHZ channel bandwidth, and a 25 GHz channel bandwidth.
Figure 2D:
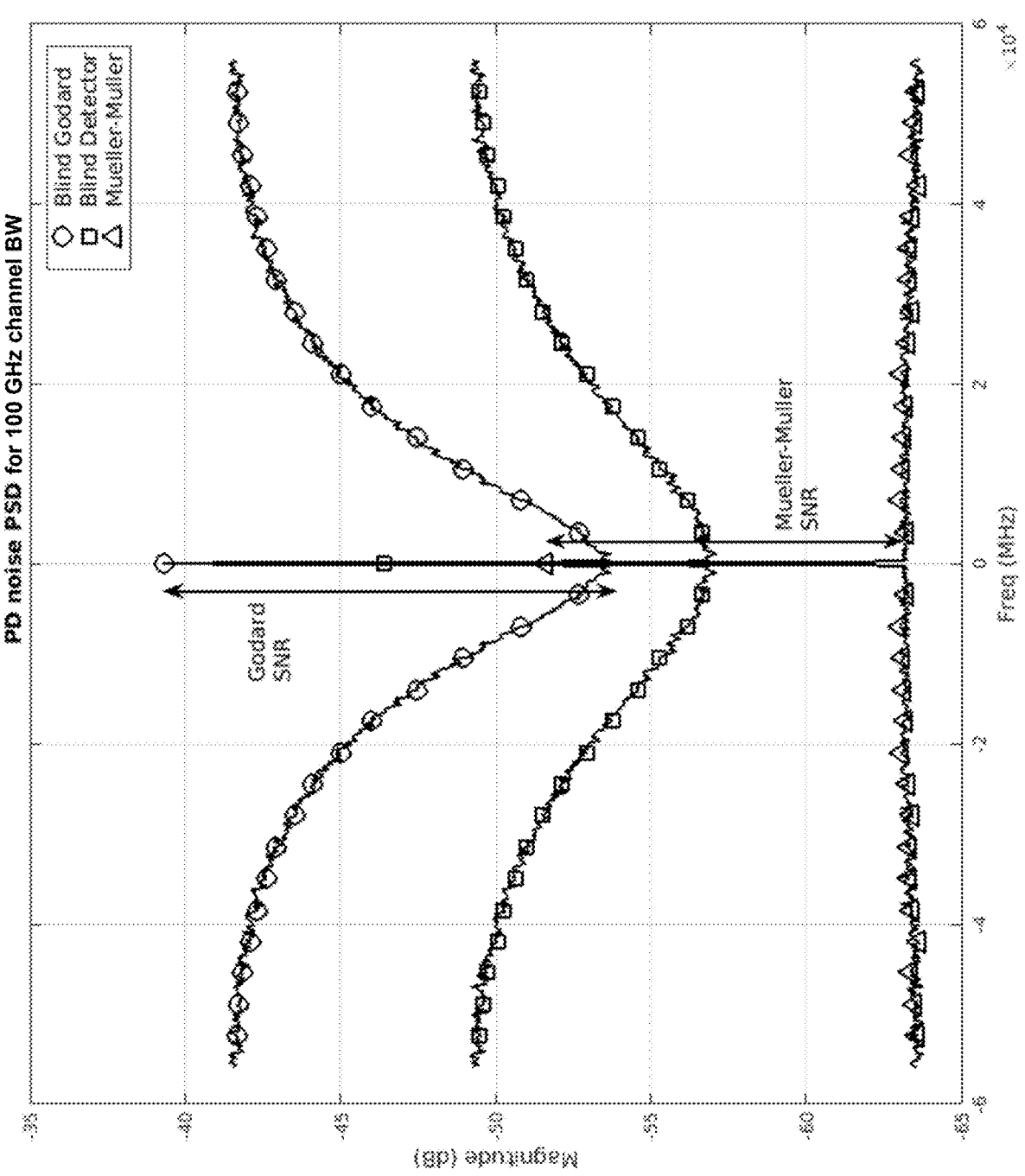
Figure 2E:
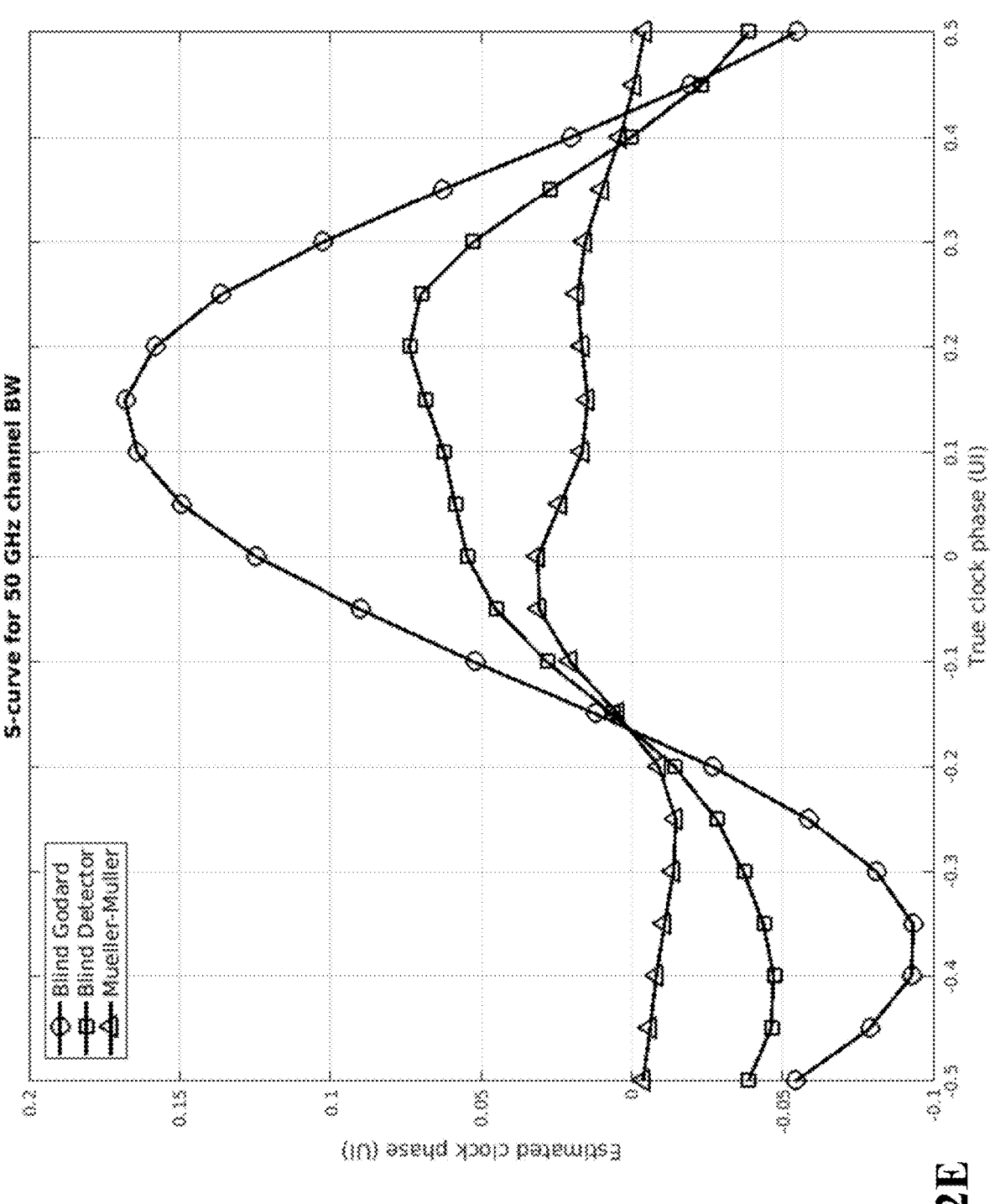
Figure 2F:
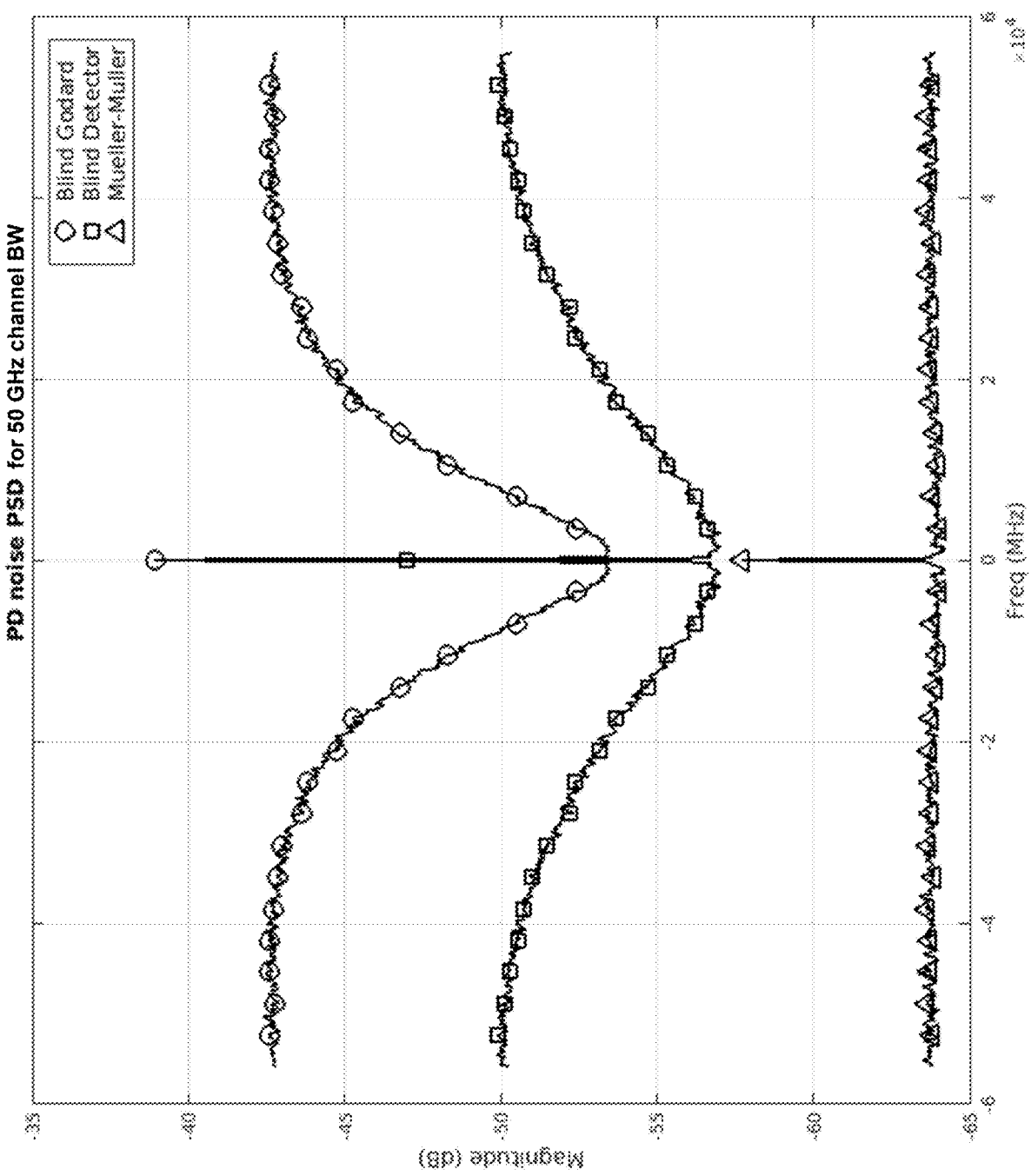
Figure 2G:
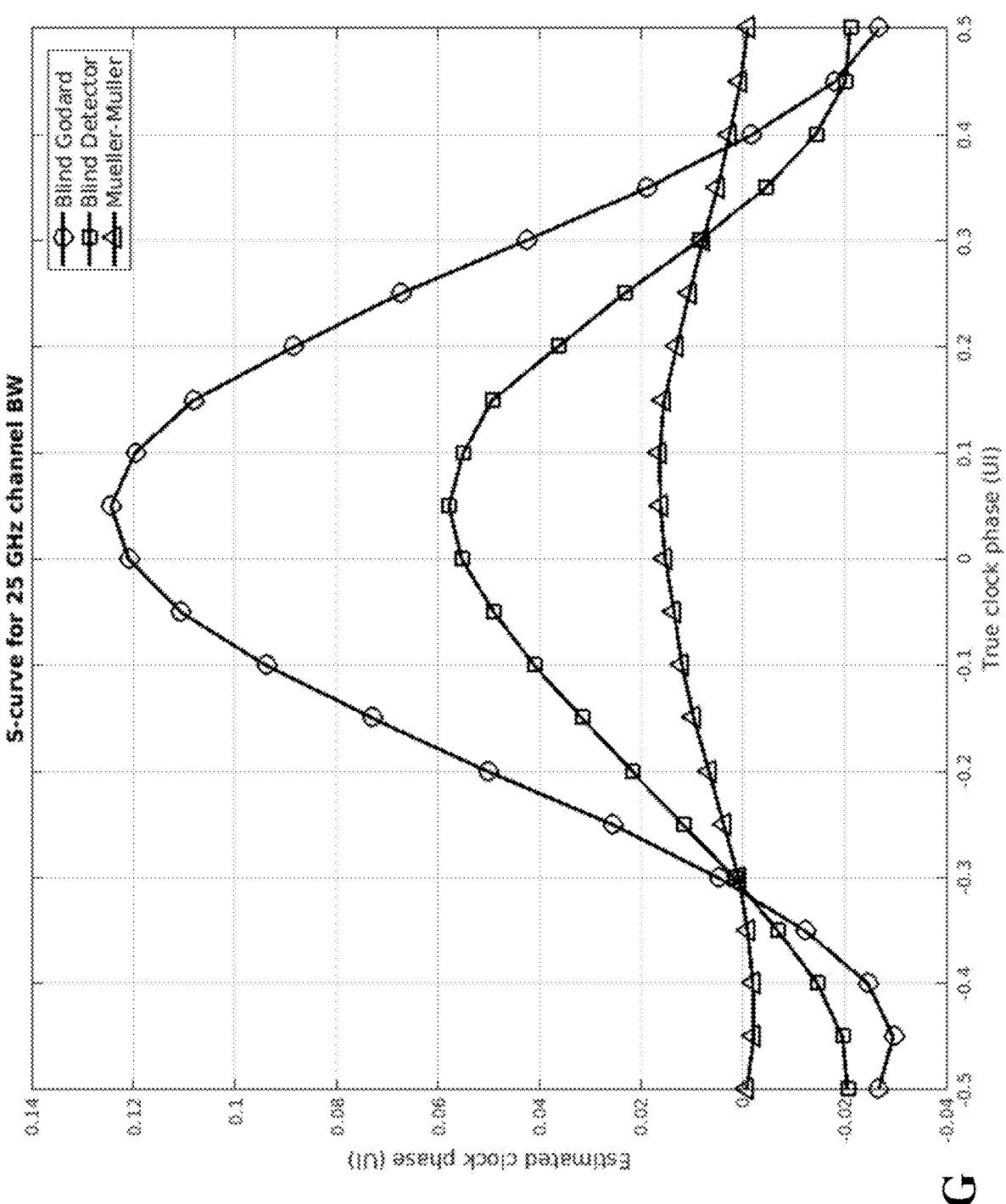
Figure 2H:
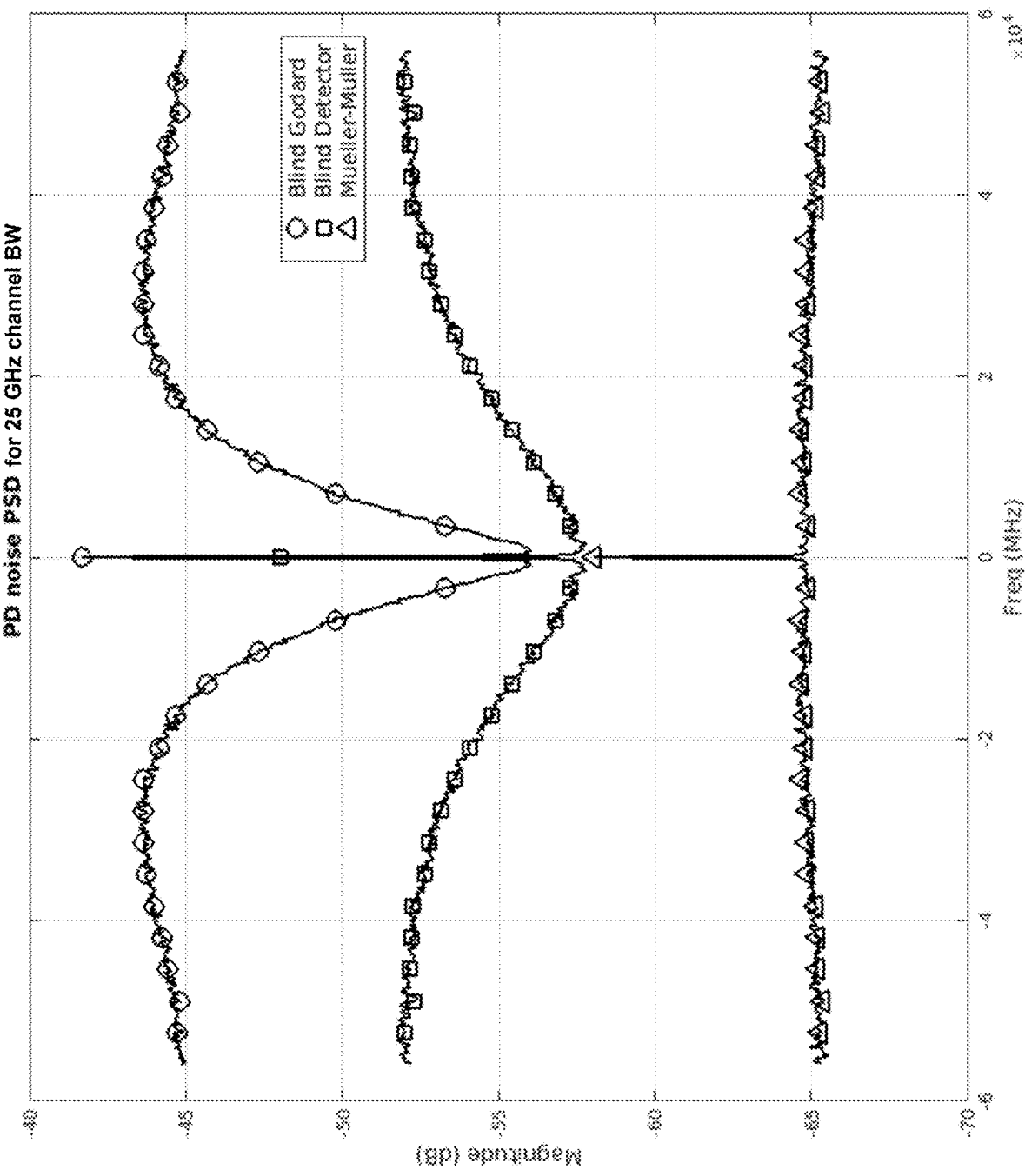

Referring to FIGS. 2C and 2D for the 100 GHz channel bandwidth scenario, the blind Godard method yielded a (e.g., near) sinusoidal S-curve shape over the range of [−0.5, 0.5] UI. The zero-crossing point for the methods was the same, but shifted by −0.1 UI due to the IIR channel group delay. The true clock phase for this evaluation was set to 0.1 UI—i.e., the maximum linear range of the methods. Note that the noise PSD of the metric of the blind Godard detector is not flat (FIG. 2D), but rather exhibits a large dip around direct current (DC), which is the location of the true clock phase. The following are several observations that can be made from FIGS. 2C to 2H:

The blind Godard method's noise PSD is, on average, about 8 dB higher than that for the blind detector, indicating that the blind Godard method maintains a more stable scaling factor—i.e., the ratio $$\frac{\text{true clock phase}}{\text{estimated clock phase}}.$$

The blind detector method's metric scaling factor appears to be sensitive to noise and channel bandwidth.
  The larger the noise PSD dip, the better the performance improvement after low pass filtering. The MM detector's noise PSD is relatively flat and thus its low-pass filtered performance is not as good as that of the blind Godard method and the blind detector method.
  The phase detector's SNR can be identified by looking at the power difference between the DC bin and a bin that is next to it, when resolution bandwidth (RBW) is set to 4 Megahertz (MHz). We measure the SNR after the 4 MHz loop bandwidth, which is more representative of system performance in closed loop.

Table 1 below summarizes the results of testing of the three aforementioned phase detectors for various permutations of channel bandwidth and noise level.

16

| Test case # | Channel BW (GHz) | Signal SNR (dB) | Blind Godard SNR (dB) | Blind Detector SNR (dB) | MM Detector SNR (dB) |
|---|---|---|---|---|---|
| 1 | Inf | Inf | 29 | 30.6 | 39.5 |
| 2 | Inf | 13 | 27.3 | 24.3 | 30.4 |
| 3 | inf | 6 | 21.4 | 16.8 | 17.8 |
| 4 | 100 | inf | 32.2 | 28.6 | 30.5 |
| 5 | 100 | 13 | 28.7 | 25.4 | 26.5 |
| 6 | 100 | 6 | 25.1 | 21.5 | 20.6 |
| 7 | 50 | inf | 31.4 | 23.5 | 6.5 |
| 8 | 50 | 13 | 31.3 | 25.4 | 21 |
| 9 | 50 | 6 | 24.8 | 22.4 | 20.9 |
| 10 | 25 | inf | 32.9 | 27 | 23.3 |
| 11 | 25 | 13 | 29.2 | 25.5 | 20.9 |
| 12 | 25 | 6 | 23.8 | 20.2 | 18.2 |

As noted above, the phase detector metric SNR was measured at 0.1 UI true clock phase and 4 MHz loop bandwidth. The blind detector and MM detector methods perform the best when the channel is perfectly flat and there is no noise (i.e., test case #1), with the MM detector performing better than the blind Godard detector and the blind detector by about 10 dB. However, once more noise is added and channel ISI is introduced, the MM detector's performance drops drastically relative to the blind Godard detector and the blind detector. The MM detector method thus only appears to excel under ideal channel conditions, where the modulation error is kept minimal. The blind Godard method performs better than the blind detector method by at least 3 dB across the various test permutations. So long as there is un-equalized channel ISI, the blind Godard method performs much better than the MM detector method, which suggests that the blind Godard algorithm is highly suitable for controlling the feed-back loop. Under realistic channel conditions, therefore, the blind Godard method performs much more reliably.

The following is a brief description of the difficulties of getting the clock phase detector loop to lock at high ppm offsets (i.e., between the Tx clock and the Rx sampling clock), and an innovative solution to facilitate the locking by leveraging the sinusoidal S-curve provided by the blind Godard detector. First, the dynamic range of the blind Godard detector is significantly reduced at lower channel bandwidths. The blind Godard detector also contains a DC bias in cases where the channel contains only post-cursor taps (as shown in the S-curve for the 25 GHz bandwidth scenario in FIG. 2G). Further, loop latency is high and the loop filter bandwidth (which is limited by the loop delay) is insufficient for the loop to lock at high ppm offsets. While the conventional technique of sweeping the ppm offset at small steps (e.g., 10-20 ppm at a time) until the locking is successful can be employed, this process can take a long time. In exemplary embodiments, the clock offset can be estimated rather quickly by taking advantage of the (e.g., perfect) sinusoidal S-curve of the blind Godard detector and calculating the Fast Fourier Transform (FFT) on the raw blind Godard phase detector metric. Specifically, when the Rx clock is not perfectly synchronized with the Tx clock, the phase difference between the two clocks can change continuously. If this phase difference accumulates to a full clock cycle (i.e., 360 degrees), the Rx clock effectively "slips" by one cycle relative to the Tx clock—hence, a cycle slip. The blind Godard detector generates a metric that generally follows a sinusoidal pattern—i.e., S-curve, which represents the phase difference between the Tx clock and the Rx clock. The sinusoidal nature of the S-curve allows for precise detection of phase differences. Each time a cycle slip occurs, the blind Godard phase detector metric completes one full sinusoidal cycle. This is because the phase difference between the Tx and Rx clocks changes continuously and periodically as they drift apart. The number of complete sinusoidal cycles (sinusoids) in the blind Godard phase detector metric can thus be counted over a certain period (e.g., capture length), which reflects or converts to the number of cycle slips that have occurred. This information can be leveraged by the clock recovery process such that it can begin at a frequency that is equal or closer to the actual Tx clock frequency, which can help the clock recovery loop lock much more reliably. In various embodiments, a ppm detection block 250z may be incorporated between the blind Godard PD block 250g and the loop filter 250p in the system of FIG. 2A and be configured to perform operations that include:

opening the clock loop and permitting cycle slip to occur continuously;

capturing the raw blind Godard phase detector metric in open-loop; each time the cycle slips, the metric would show a complete sinusoid; and counting the number of sinusoids and dividing it by the capture length to obtain an estimate of the ppm offset.

Figure 2I:
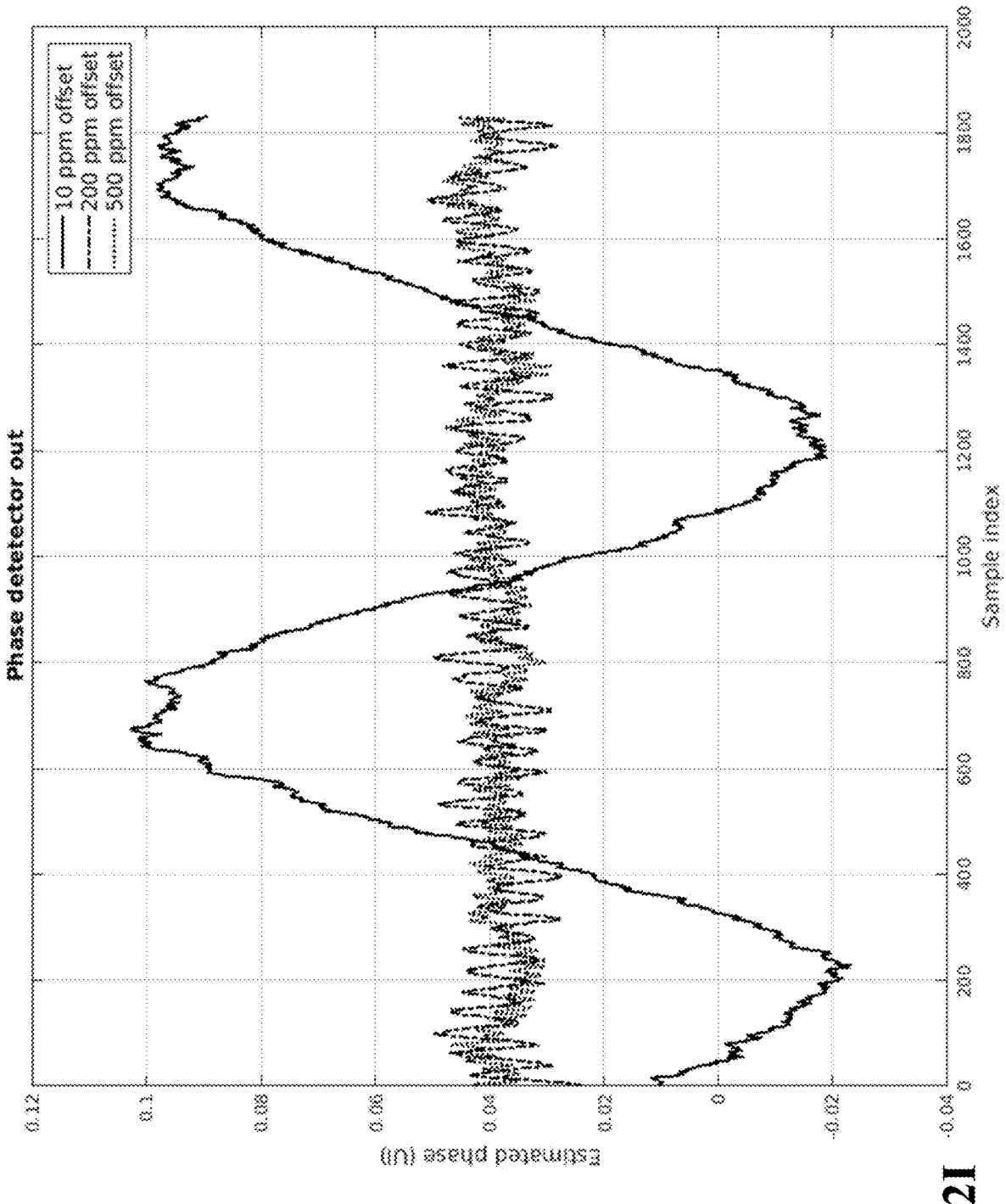
FIGS. 2I and 2J respectively illustrate an output of a blind Godard phase detector and a Fast Fourier Transform (FFT) thereof in the case of a 25 GHz bandwidth channel, with 13 dB SNR and a parts-per-million (ppm) offset varying from 10 to 500 ppm.
Figure 2J:
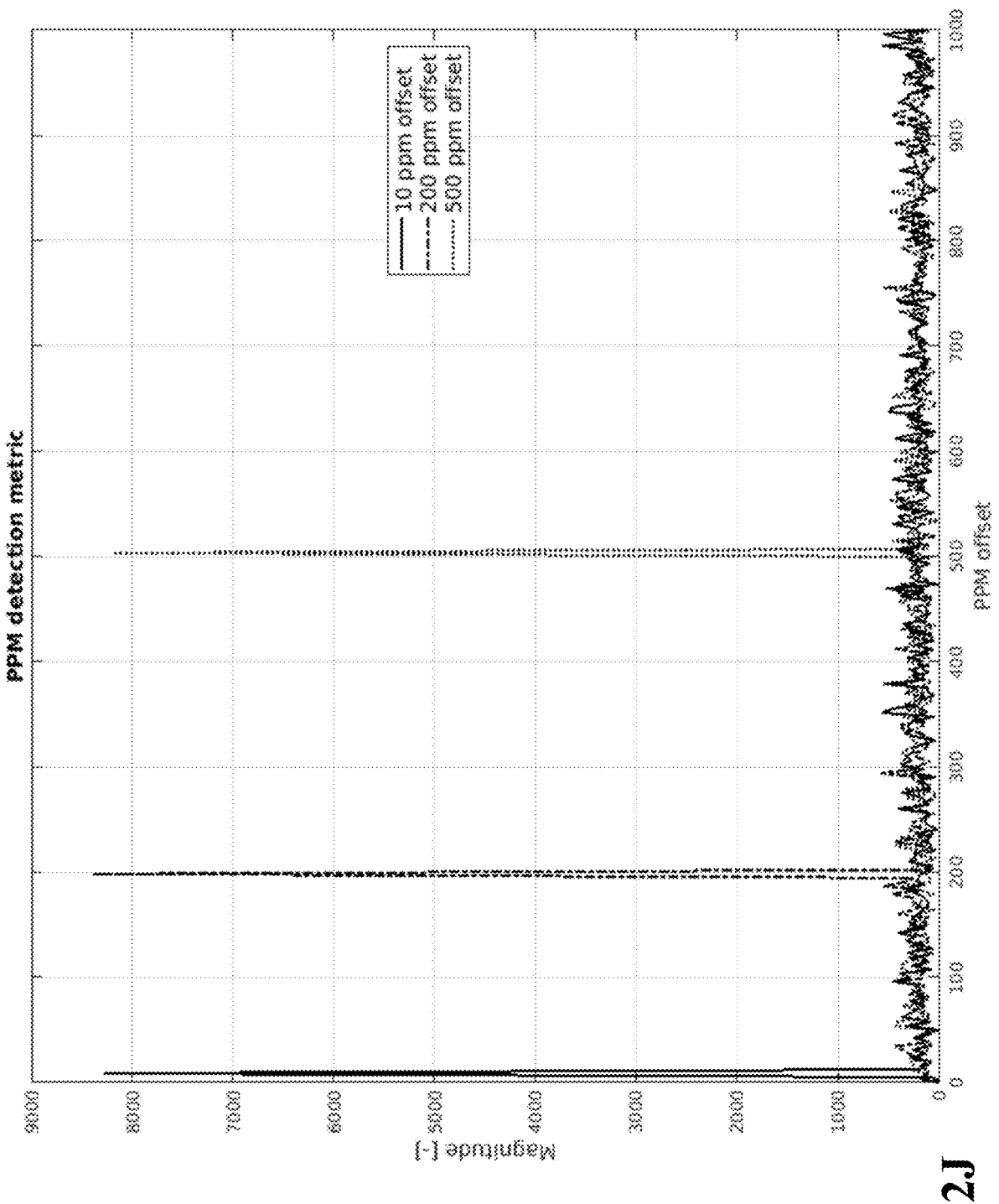

Counting of the number of sinusoids can be effected, for instance, by taking the FFT or performing a cosine transform on the raw blind Godard phase detector metric. FIGS. 2I and 2J respectively illustrate an output of the blind Godard phase detector and an FFT thereof in the case of a 25 GHz bandwidth channel, with 13 dB SNR and the ppm offset varying from 10 to 500 ppm. As illustrated in FIG. 2I, the low bandwidth channel biases the phase detector output to around 0.05 UI. This would generally not be an issue for a 10 ppm offset since the S-curve still crosses zero, which allows for the loop to lock. However, at a 200 ppm offset, the phase detector output is scaled down significantly and no longer crosses zero. This causes the loop to diverge and become unstable. At a 500 ppm offset, the phase detector output simply acts like noise that is centered at 0.05 UI. Notwithstanding, the FFT of the raw blind Godard phase detector metric (FIG. 2J) shows a strong correlation with the ppm offset. In all evaluated cases, the ppm offset was reliably detected using the foregoing technique, allowing for the detected value to be seeded to the loop to facilitate convergence. In various embodiments, the loop filter 250p may be a proportional-integral (PI) controller—i.e., a proportional component that attempts to lock the phase and an integral component that attempts to lock the frequency. Both of these components may attempt to converge using only the output of the blind Godard phase detector. By obtaining the ppm offset using the foregoing technique and providing it to the loop filter 250p, the residual ppm offset would appear to be at or near zero to the loop filter 250p. For instance, assume that a ppm offset of 5 ppm remains, meaning that for an actual ppm offset of 500, assume that 495 ppm offset was calculated and fed into the integral component of the loop filter 250p. In such a case, the loop filter 250p may spin out at 495 ppm and sample the ADC at such a rate. Since a 495 ppm offset is only a 5 ppm difference from the actual 500 ppm offset, seeding a 495 ppm offset to the loop filter 250p which is quite close to the actual ppm offset would result in the blind Godard detector "seeing" only a 5 ppm residual. With such a small residual, the output of the phase detector will have a larger dynamic range—i.e. the S-curve's peak-to-peak amplitude increases significantly, as illustrated in FIG. 2I, which allows for the loop filter 250p to lock to the true 500 ppm offset, despite it being provided or seeded with only a 495 ppm offset.

Although the ppm offset detection method has been described above in relation to the blind Godard phase detector, in various embodiments, the technique can alternatively be used with other types of phase detectors. Regardless of the type of phase detector involved, the ppm offset detection method may perform the detection by computing the Discrete Fourier Transform (DFT) (e.g., using the FFT, the Goertzel algorithm, and/or the like) on the output of the phase detector, and identifying the frequency bin that has high power (e.g., the highest power or power that exceeds a threshold). Again, the technique relies on S-curve repetition, which can be converted to cycle slip, where the amount of cycle slip that occurs over a given time period can be directly converted to ppm offset. Of course, in the case of the blind Godard phase detector, the (e.g., perfect) sinusoidal S-curve characteristic of its output makes the DFT-based detection very accurate and resilient to noise. The ppm offset detection technique thus works best with phase detectors that can provide sinusoidal (or near sinusoidal) S-curve outputs.

It is to be understood and appreciated that, although one or more of FIGS. 1A to 1C and 2A might be described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein. Furthermore, while various components, devices, systems, modules, blocks, circuits, etc. may have been illustrated in one or more of FIGS. 1A to 1C and 2A as separate components, devices, systems, modules, circuits, etc., it will be appreciated that multiple components, devices, systems, modules, blocks, circuits, etc. can be implemented as a single component, device, system, module, circuit, etc., or a single component, device, system, module, block, circuit, etc. can be implemented as multiple components, devices, systems, modules, blocks, circuits, etc. Additionally, functions described as being performed by one component, device, system, module, block, circuit, etc. may be performed by multiple components, devices, systems, modules, circuits, etc., or functions described as being performed by multiple components, devices, systems, modules, blocks, circuits, etc. may be performed by a single component, device, system, module, circuit, etc.

FIG. 3 depicts an illustrative embodiment of a method 300 in accordance with various aspects described herein.

At 302, the method can include obtaining, from a sampling device of a receiver, samples of a signal that is received from a transmitter. For example, the blind Godard phase detector 250g may, similar to that described above with respect to at least FIG. 2A, perform one or more operations that include obtaining, from a sampling device of a receiver, samples of a signal that is received from a transmitter.

At 304, the method can include facilitating acquisition between the receiver and the transmitter by deriving, based on the samples, a phase error output for centering a sampling clock of the sampling device with respect to a transmitter clock, wherein the deriving involves estimating group delay using a detection algorithm that is based on a blind Godard LMS algorithm. For example, the blind Godard phase detector 250g may, similar to that described above with respect to at least FIG. 2A, perform one or more operations that include facilitating acquisition between the receiver and the transmitter by deriving, based on the samples, a phase error output for centering a sampling clock of the sampling device with respect to a transmitter clock, wherein the deriving involves estimating group delay using a detection algorithm that is based on a blind Godard LMS algorithm.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
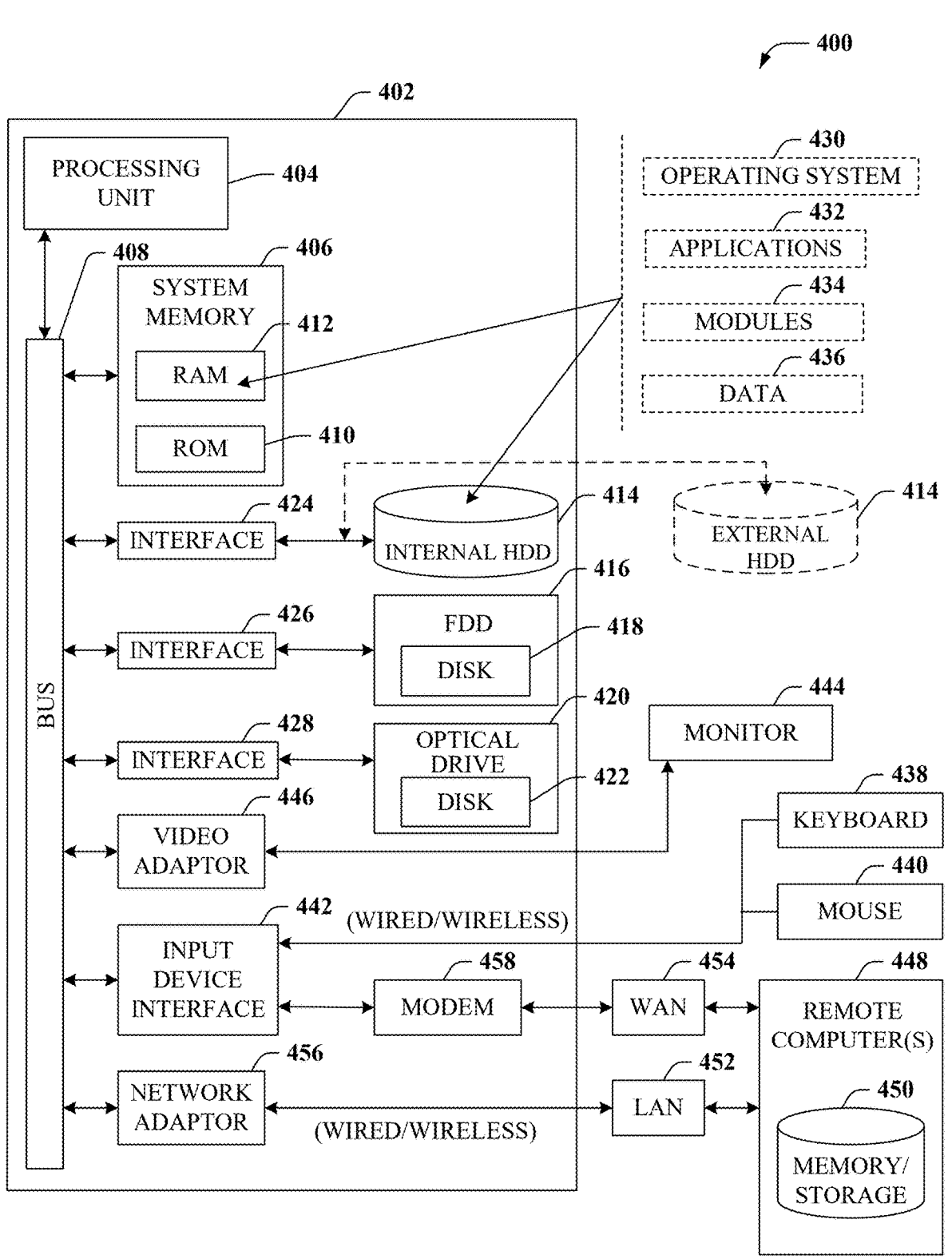
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. For example, computing environment 400 can facilitate, in whole or in part, blind Godard-based clock phase detection for T-spaced signals.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can comprise the widest variety of storage media including tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized. It is also to be understood and appreciated that the subject matter in one or more dependent claims may be combined with that in one or more other dependent claims.

What is claimed is:

1. A receiver, comprising:
a sampling device configured to use a sampling clock to sample a signal that is received from a transmitter; and
a blind clock phase detector configured to facilitate acquisition between the receiver and the transmitter by deriving, based on samples of the signal provided by the sampling device, a phase error output for centering the sampling clock with respect to a transmitter clock, wherein the deriving involves estimating group delay using a detection algorithm that is based on a blind Godard least mean square (LMS) algorithm.

2. The receiver of claim 1, wherein the signal relates to a T-spaced transmission that is sent from the transmitter over one or more electrical channels or one or more optical channels.

3. The receiver of claim 1, wherein the blind Godard LMS algorithm involves a cost function representing dispersion of order-p, wherein p is a natural number, and wherein higher values of p indicate higher order dispersion.

4. The receiver of claim 1, wherein the detection algorithm is derived from an approximation of an LMS response as a sinc pulse.

5. The receiver of claim 1, wherein the group delay is estimated as half of a difference between side taps of an LMS response with three taps.

6. The receiver of claim 1, wherein the group delay is estimated by calculating a product of a non-linear function of a current sample and a linear combination of conjugates of neighboring samples.

7. The receiver of claim 1, wherein the estimating is based on three adjacent samples of the signal.

8. The receiver of claim 1, wherein the estimating is based on only two adjacent samples of the signal.

9. The receiver of claim 1, wherein the blind clock phase detector is included in a clock recovery loop that includes a loop filter configured to utilize the phase error output for the centering, and wherein the clock recovery loop is separate from an equalizer loop or a carrier recovery loop.

10. The receiver of claim 1, wherein the deriving is performed without relying on signal overhead or decoding or equalization of the signal.

11. The receiver of claim 1, further comprising one or more components included in or associated with the blind clock phase detector that are configured to determine an offset between the sampling clock and the transmitter clock by obtaining a Fast Fourier Transform (FFT) or a cosine transform of the phase error output.

12. The receiver of claim 1, wherein the samples are stored in and obtained from a receiver front end test (RFET) memory.

13. The receiver of claim 1, wherein the sampling device comprises or is included in an analog to digital converter (ADC).

14. A non-transitory machine-readable medium, comprising executable instructions that, when executed by a processing system of a receiver including a processor, facilitate performance of operations, the operations comprising:
obtaining, from a sampling device of the receiver, samples of a signal that is received from a transmitter; and
facilitating acquisition between the receiver and the transmitter by deriving, based on the samples, a phase error output for centering a sampling clock of the sampling device with respect to a transmitter clock, wherein the deriving involves estimating group delay using a detection algorithm that is based on a blind Godard least mean square (LMS) algorithm.

15. The non-transitory machine-readable medium of claim 14, wherein the signal relates to a T-spaced transmission that is sent from the transmitter over one or more electrical channels or one or more optical channels.

16. The non-transitory machine-readable medium of claim 14, wherein the blind Godard LMS algorithm involves a cost function representing dispersion of order-p, wherein p is a natural number, and wherein higher values of p indicate higher order dispersion.

17. The non-transitory machine-readable medium of claim 14, wherein the group delay is estimated as half of a difference between side taps of an LMS response with three taps.

18. The non-transitory machine-readable medium of claim 14, wherein the group delay is estimated by calculating a product of a non-linear function of a current sample and a linear combination of conjugates of neighboring samples.

19. A method, comprising:

obtaining, by at least one processor of a receiver and from a sampling device of the receiver, samples of a signal that is received from a transmitter; and facilitating, by the at least one processor, acquisition between the receiver and the transmitter by deriving, based on the samples, a phase error output for centering a sampling clock of the sampling device with respect to a transmitter clock, wherein the deriving involves estimating group delay using a detection algorithm that is based on a blind Godard least mean square (LMS) algorithm.

20. The method of claim 19, wherein the signal relates to a T-spaced transmission that is sent from the transmitter over one or more electrical channels or one or more optical channels.

21. A modem, comprising:

a sampling device configured to use a sampling clock to sample signals received from a transmitter; and a clock recovery loop that includes a phase detector configured to derive an output for centering the sampling clock with respect to a transmitter clock, a loop filter configured to adjust a frequency of the sampling clock, and a frequency offset detector configured to apply a Discrete Fourier Transform (DFT) on the output to identify a frequency offset between the sampling clock and the transmitter clock, resulting in an identified frequency offset, and provide the identified frequency offset to the loop filter to facilitate adjustment of the frequency.

22. The modem of claim 21, wherein the frequency offset is in parts-per-million (PPM).

* * * * *